United States Patent
Yamazaki et al.

(10) Patent No.: US 7,916,232 B2
(45) Date of Patent: Mar. 29, 2011

(54) ELECTRO-OPTICAL DEVICE AND METHOD FOR DRIVING THE SAME

(75) Inventors: Shunpei Yamazaki, Tokyo (JP); Akira Mase, Aichi (JP); Masaaki Hiroki, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 49 days.

(21) Appl. No.: 12/415,215

(22) Filed: Mar. 31, 2009

(65) Prior Publication Data
US 2009/0190056 A1  Jul. 30, 2009

Related U.S. Application Data

(60) Continuation of application No. 09/285,899, filed on Apr. 8, 1999, now abandoned, and a division of application No. 08/912,298, filed on Jul. 31, 1997, now Pat. No. 5,963,278, and a continuation of application No. 08/634,382, filed on Apr. 18, 1996, now abandoned, and a division of application No. 08/153,080, filed on Nov. 16, 1993, now Pat. No. 5,568,288, and a division of application No. 07/857,597, filed on Mar. 25, 1992, now Pat. No. 5,287,205.

(30) Foreign Application Priority Data

Mar. 26, 1991 (JP) ...................................... 3-087780

(51) Int. Cl.
G02F 1/136 (2006.01)
(52) U.S. Cl. .......................................... 349/43; 349/47
(58) Field of Classification Search .................... 349/47, 349/43
See application file for complete search history.

(56) References Cited

U.S. PATENT DOCUMENTS
3,838,209 A   9/1974  Tsuchiya et al.
(Continued)

FOREIGN PATENT DOCUMENTS
EP   0 161 555   11/1985
(Continued)

OTHER PUBLICATIONS

1990 IEEE International Solid-State Circuits Conference Digest of Technical Papers; Feb. 16, 1990, San Francisco, CA, pp. 220-221, 301, XP000201945, S.N. Lee et al. "A 5×9 Inch Polysilicon Gray-Scale Color Head Down Display Chip."

(Continued)

*Primary Examiner* — James A Dudek
(74) *Attorney, Agent, or Firm* — Eric J. Robinson; Robinson Intellectual Property Law Office, P.C.

(57) ABSTRACT

A novel structure of an active electro-optical device is disclosed. The device is provided with complementary thin film insulated gate field affect transistors (TFTs) therein which comprise a P-TFT and an N-TFT. P-TFT and N-TFT are connected to a common signal line by the gate electrodes thereof, while the source (or drain) electrodes thereof are connected to a common signal line as well as to one of the picture element electrodes. In case of driving the active electro-optical device, a gradation display can be carried out in a driving method having a display timing determined in relation to a time F for writing one screen and a time (t) for writing in one picture element, by applying a reference signal in a cycle of the time (t), to the signal line used for a certain picture element driving selection, and by applying the select signal to the other signal line at a certain timing within the time (t), and whereby setting the value of the voltage to be applied to a liquid crystal.

29 Claims, 26 Drawing Sheets

U.S. PATENT DOCUMENTS

| | | | |
|---|---|---|---|
| 3,896,430 A | 7/1975 | Hatsukano | |
| 3,955,187 A | 5/1976 | Bigelow | |
| 4,021,607 A | 5/1977 | Amano | |
| 4,036,553 A | 7/1977 | Borel et al. | |
| 4,068,020 A | 1/1978 | Reuschel | |
| 4,103,297 A | 7/1978 | McGreivy et al. | |
| 4,239,346 A | 12/1980 | Lloyd | |
| 4,365,013 A | 12/1982 | Ishioka et al. | |
| 4,378,417 A | 3/1983 | Maruyama et al. | |
| 4,427,978 A | 1/1984 | Williams | |
| 4,427,979 A | 1/1984 | Clerc et al. | |
| 4,435,047 A * | 3/1984 | Fergason | 349/86 |
| 4,455,737 A | 6/1984 | Godejahn, Jr. | |
| 4,468,855 A | 9/1984 | Sasaki | |
| 4,557,036 A | 12/1985 | Kyuragi et al. | |
| 4,559,535 A | 12/1985 | Watkins et al. | |
| 4,591,892 A | 5/1986 | Yamazaki | |
| 4,597,160 A | 7/1986 | Ipri | |
| 4,597,637 A | 7/1986 | Ohta | |
| 4,600,274 A | 7/1986 | Morozumi | |
| 4,646,426 A | 3/1987 | Sasaki | |
| 4,649,432 A | 3/1987 | Watanabe et al. | |
| 4,650,543 A | 3/1987 | Kishita et al. | |
| 4,653,862 A | 3/1987 | Morozumi | |
| 4,660,030 A | 4/1987 | Maezawa | |
| 4,680,580 A | 7/1987 | Kawahara | |
| 4,704,002 A | 11/1987 | Kikuchi et al. | |
| 4,716,403 A | 12/1987 | Morozumi | |
| 4,740,829 A | 4/1988 | Nakagiri et al. | |
| 4,742,346 A | 5/1988 | Gillette et al. | |
| 4,743,096 A | 5/1988 | Wakai et al. | |
| 4,746,628 A | 5/1988 | Takafuji et al. | |
| 4,752,774 A | 6/1988 | Clerc et al. | |
| 4,769,338 A | 9/1988 | Ovshinsky et al. | |
| 4,770,502 A | 9/1988 | Kitazima et al. | |
| 4,814,041 A | 3/1989 | Auda | |
| 4,818,075 A | 4/1989 | Takao et al. | |
| 4,818,077 A | 4/1989 | Ohwada et al. | |
| 4,818,981 A | 4/1989 | Oki et al. | |
| 4,841,294 A | 6/1989 | Clerc | |
| 4,857,907 A | 8/1989 | Koden | |
| 4,860,069 A | 8/1989 | Yamazaki | |
| 4,862,237 A | 8/1989 | Morozumi | |
| 4,868,137 A | 9/1989 | Kubota | |
| 4,873,516 A | 10/1989 | Castleberry | |
| 4,888,305 A | 12/1989 | Yamazaki et al. | |
| 4,891,330 A | 1/1990 | Guha et al. | |
| 4,897,360 A | 1/1990 | Guckel et al. | |
| 4,897,639 A | 1/1990 | Kanayama | |
| 4,900,695 A | 2/1990 | Takahashi et al. | |
| 4,905,066 A | 2/1990 | Dohjo et al. | |
| 4,908,710 A | 3/1990 | Wakai et al. | |
| 4,930,874 A | 6/1990 | Mitsumune et al. | |
| 4,934,791 A | 6/1990 | Shimizu et al. | |
| 4,938,565 A | 7/1990 | Ichikawa | |
| 4,949,141 A | 8/1990 | Busta | |
| 4,959,700 A | 9/1990 | Yamazaki | |
| 4,960,719 A | 10/1990 | Tanaka et al. | |
| 4,969,025 A | 11/1990 | Yamamoto et al. | |
| 4,969,031 A | 11/1990 | Kobayashi et al. | |
| 4,973,135 A | 11/1990 | Okada et al. | |
| 4,984,033 A | 1/1991 | Ishizu et al. | |
| 4,986,213 A | 1/1991 | Yamazaki et al. | |
| 5,003,356 A | 3/1991 | Wakai et al. | |
| 5,012,228 A | 4/1991 | Masuda et al. | |
| 5,016,610 A | 5/1991 | Meguro et al. | |
| 5,017,914 A | 5/1991 | Uchida et al. | |
| 5,032,883 A | 7/1991 | Wakai et al. | |
| 5,051,570 A | 9/1991 | Tsujikawa et al. | |
| 5,055,899 A | 10/1991 | Wakai et al. | |
| 5,056,895 A | 10/1991 | Kahn | |
| 5,073,772 A | 12/1991 | Takafuji et al. | |
| 5,077,223 A | 12/1991 | Yamazaki | |
| 5,084,905 A | 1/1992 | Sasaki et al. | |
| 5,091,722 A | 2/1992 | Kitajima et al. | |
| 5,093,738 A | 3/1992 | Watanabe et al. | |
| 5,097,311 A | 3/1992 | Iwase et al. | |
| 5,101,289 A | 3/1992 | Takao et al. | |
| RE33,882 E | 4/1992 | Morozumi | |
| 5,113,181 A | 5/1992 | Inoue et al. | |
| 5,132,754 A | 7/1992 | Serikawa et al. | |
| 5,132,821 A | 7/1992 | Nicholas | |
| 5,142,272 A | 8/1992 | Kondo | |
| 5,144,392 A | 9/1992 | Brotherton | |
| 5,146,355 A | 9/1992 | Prince et al. | |
| 5,157,386 A | 10/1992 | Uchida et al. | |
| 5,159,476 A | 10/1992 | Hayashi | |
| 5,166,085 A | 11/1992 | Wakai et al. | |
| 5,166,816 A | 11/1992 | Kaneko et al. | |
| 5,182,620 A | 1/1993 | Shimada et al. | |
| 5,196,738 A | 3/1993 | Takahara et al. | |
| 5,196,839 A | 3/1993 | Johary et al. | |
| 5,200,846 A | 4/1993 | Hiroki et al. | |
| 5,206,635 A | 4/1993 | Inuzuka et al. | |
| 5,208,690 A * | 5/1993 | Hayashi et al. | 349/143 |
| 5,227,900 A | 7/1993 | Inaba et al. | |
| 5,229,644 A | 7/1993 | Wakai et al. | |
| 5,235,195 A | 8/1993 | Tran et al. | |
| 5,250,818 A | 10/1993 | Saraswat et al. | |
| 5,250,931 A | 10/1993 | Misawa et al. | |
| 5,251,071 A | 10/1993 | Kusukawa et al. | |
| 5,264,839 A | 11/1993 | Kanno et al. | |
| 5,269,880 A | 12/1993 | Jolly et al. | |
| 5,287,205 A | 2/1994 | Yamazaki et al. | |
| 5,308,998 A | 5/1994 | Yamazaki et al. | |
| 5,327,001 A | 7/1994 | Wakai et al. | |
| 5,329,390 A | 7/1994 | Fujiwara et al. | |
| 5,358,810 A | 10/1994 | Yoshino | |
| 5,365,357 A | 11/1994 | Ohgawara et al. | |
| 5,371,398 A * | 12/1994 | Nishihara | 257/435 |
| 5,408,246 A | 4/1995 | Inaba et al. | |
| 5,412,494 A | 5/1995 | Ishiwata et al. | |
| 5,414,442 A | 5/1995 | Yamazaki et al. | |
| 5,414,443 A | 5/1995 | Kanatani et al. | |
| 5,453,858 A | 9/1995 | Yamazaki | |
| 5,493,429 A | 2/1996 | Kanemoto et al. | |
| 5,495,353 A | 2/1996 | Yamazaki et al. | |
| 5,514,879 A | 5/1996 | Yamazaki | |
| 5,521,107 A | 5/1996 | Yamazaki et al. | |
| 5,568,288 A | 10/1996 | Yamazaki et al. | |
| 5,612,799 A | 3/1997 | Yamazaki et al. | |
| 5,614,730 A | 3/1997 | Nakazawa et al. | |
| 5,614,732 A | 3/1997 | Yamazaki | |
| 5,623,353 A | 4/1997 | Kanemoto et al. | |
| 5,666,173 A | 9/1997 | Mase et al. | |
| 5,701,167 A | 12/1997 | Yamazaki | |
| 5,744,818 A | 4/1998 | Yamazaki et al. | |
| 5,784,073 A | 7/1998 | Yamazaki et al. | |
| 5,849,601 A | 12/1998 | Yamazaki | |
| 5,854,879 A | 12/1998 | Inuzuka et al. | |
| 5,859,445 A | 1/1999 | Yamazaki | |
| 5,899,547 A | 5/1999 | Yamazaki et al. | |
| 5,905,555 A | 5/1999 | Yamazaki et al. | |
| 5,913,112 A | 6/1999 | Yamazaki et al. | |
| 5,946,059 A | 8/1999 | Yamazaki et al. | |
| RE36,314 E | 9/1999 | Yamazaki et al. | |
| 5,956,105 A | 9/1999 | Yamazaki et al. | |
| 5,962,870 A | 10/1999 | Yamazaki et al. | |
| 6,011,277 A | 1/2000 | Yamazaki | |
| 6,013,928 A | 1/2000 | Yamazaki et al. | |
| 6,436,815 B1 | 8/2002 | Yamazaki et al. | |
| 6,437,367 B1 | 8/2002 | Yamazaki et al. | |
| 6,549,259 B2 | 4/2003 | Sato et al. | |
| 6,657,692 B2 | 12/2003 | Shiota | |
| 6,674,106 B2 | 1/2004 | Tanaka et al. | |
| 7,489,367 B1 | 2/2009 | Yamazaki et al. | |
| 7,646,441 B2 | 1/2010 | Hiroki et al. | |

FOREIGN PATENT DOCUMENTS

| | | |
|---|---|---|
| EP | 0 298 255 | 1/1989 |
| EP | 0 321 073 | 6/1989 |
| EP | 0 349 415 | 1/1990 |
| EP | 0 372 821 | 6/1990 |
| GB | 1 396 486 | 6/1975 |
| GB | 2 130 781 | 6/1984 |
| GB | 2 187 859 | 9/1987 |
| JP | 49-052598 | 5/1974 |

| | | |
|---|---|---|
| JP | 49-077537 | 7/1974 |
| JP | 52-076897 | 6/1977 |
| JP | 53-027483 | 3/1978 |
| JP | 53-144297 | 12/1978 |
| JP | 55-032026 | 3/1980 |
| JP | 56-081972 | 7/1981 |
| JP | 57-081288 | 5/1982 |
| JP | 58-027365 | 2/1983 |
| JP | 58-032466 | 2/1983 |
| JP | 58-115864 | 7/1983 |
| JP | 58-124273 | 7/1983 |
| JP | 58-158967 | 9/1983 |
| JP | 59-061818 | 4/1984 |
| JP | 59-194783 | 12/1984 |
| JP | 59-214262 | 12/1984 |
| JP | 60-154996 | 10/1985 |
| JP | 61-136263 | 6/1986 |
| JP | 61-141174 | 6/1986 |
| JP | 62-014472 | 1/1987 |
| JP | 62-124769 | 6/1987 |
| JP | 62-126677 | 6/1987 |
| JP | 62-283664 | 12/1987 |
| JP | 62-322257 | 12/1987 |
| JP | 63-082177 | 4/1988 |
| JP | 63-096636 | 4/1988 |
| JP | 63-100777 | 5/1988 |
| JP | 63-136673 | 6/1988 |
| JP | 63-182627 | 7/1988 |
| JP | 63-200572 | 8/1988 |
| JP | 63-279228 | 11/1988 |
| JP | 64-030272 | 2/1989 |
| JP | 64-068724 | 3/1989 |
| JP | 64-068726 | 3/1989 |
| JP | 64-068728 | 3/1989 |
| JP | 64-068732 | 3/1989 |
| JP | 64-076036 | 3/1989 |
| JP | 01-107237 | 4/1989 |
| JP | 01-130131 | 5/1989 |
| JP | 01-156725 | 6/1989 |
| JP | 01-161316 | 6/1989 |
| JP | 01-165172 | 6/1989 |
| JP | 01-222226 | 9/1989 |
| JP | 01-259320 | 10/1989 |
| JP | 02-016596 | 1/1990 |
| JP | 02-051129 | 2/1990 |
| JP | 02-085826 | 3/1990 |
| JP | 02-103925 | 4/1990 |
| JP | 02-157827 | 6/1990 |
| JP | 02-188723 | 7/1990 |
| JP | 02-199498 | 8/1990 |
| JP | 02-210330 | 8/1990 |
| JP | 02-234134 | 9/1990 |
| JP | 02-277244 | 11/1990 |
| JP | 02-306627 | 12/1990 |
| JP | 03-007911 | 1/1991 |
| JP | 03-034434 | 2/1991 |
| JP | 03-059543 | 3/1991 |
| JP | 03-288824 | 12/1991 |
| JP | 04-283729 | 10/1992 |
| JP | 04-291240 | 10/1992 |

OTHER PUBLICATIONS

Proceedings of the SID, vol. 31, No. 4, 1990, Los Angeles, CA, pp. 343-347, XP000207744, S. Takahaski et al., "A 10-in. Diagonal 16-Gray-Level (4096 Color) a-Si TFT-LCD."

Wolf et al., Silicon Processing for the VLSI Era, Lattice Press, vol. 1, 1986, pp. 151-154.

Wolf et al., Silicon Processing for the VLSI Era, *2.10 Silicon-on-Insulator (SOI) Isolation Technologies*, Lattice Press, vol. 2, pp. 66-72.

IBM Technical Disclosure Bulletin, vol. 33, No. 6B, Nov. 1990, New York, pp. 384-385, XP 000108914, "Driving Method for TFT/LCD Grayscale."

*Molecular Crystals and Liquid Crystals*, vol. 185 (Aug. 1990), Chur, CH, pp. 67-74, Montgomery et al., "Improving Multiplexability of Polymer-Dispersed Liquid Crystal Films by Dual Frequency Addressing."

Japanese Journal of Applied Physics, *Characterization of µC-SI:H Films Prepared by H2 Sputtering*, vol. 29, No. 3, Mar. 1990, pp. L 385-L 387.

Japanese Journal of Applied Physics, *Growth Temperature Dependence of µC-SI:H Films Sputtered with Hydrogen Gas*, vol. 29, No. 7, Jul. 1990, pp. L 1029-L 1032.

Ohwada et al., "Peripheral Circuit Integrated Poly-Si TFT LCD with Gray Scale Representation," pp. 131-136, 1989, Proceedings of the SID, vol. 30, No. 2.

Serikawa et al., "Low-Temperature Fabrication of High-Mobility Poly-Si TFT's for Large-Area LCD's," pp. 137-141, 1989, Proceedings of the SID, vol. 30, No. 2.

Matino et al., 21.1: Horizontal Stripe Color Arrangement for Large-Size TFT-LCD, pp. 400-403, vol. 21, 1990, SID 90 Digest.

Morozumi, "Materials and Assembling Process of LCDs," pp. 171-181, No. 1, 1990, LCD Devices and Instruments Group.

Official Action, U.S. Appl. No. 09/288,509 dated Feb. 9, 2005.

\* cited by examiner

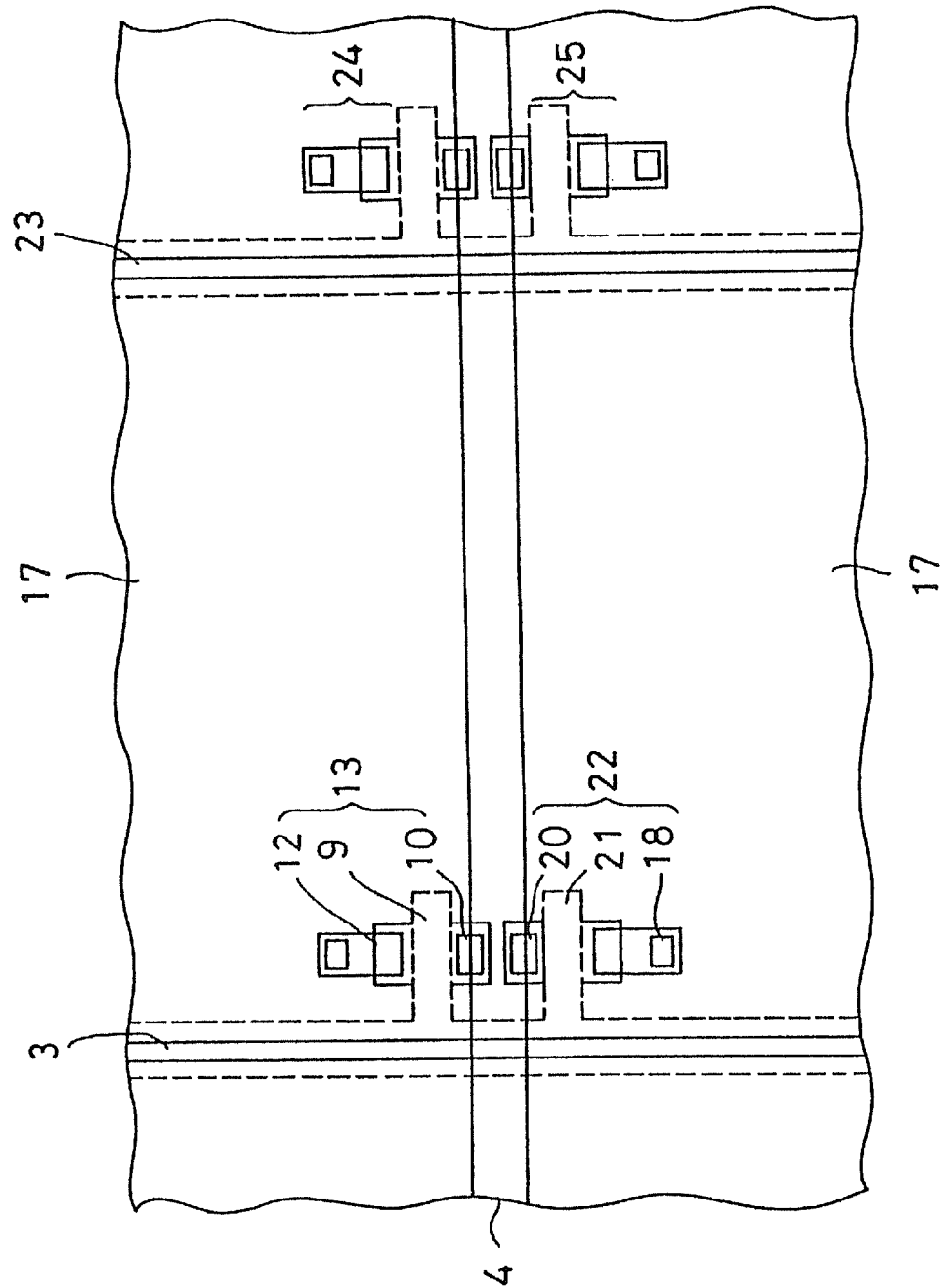

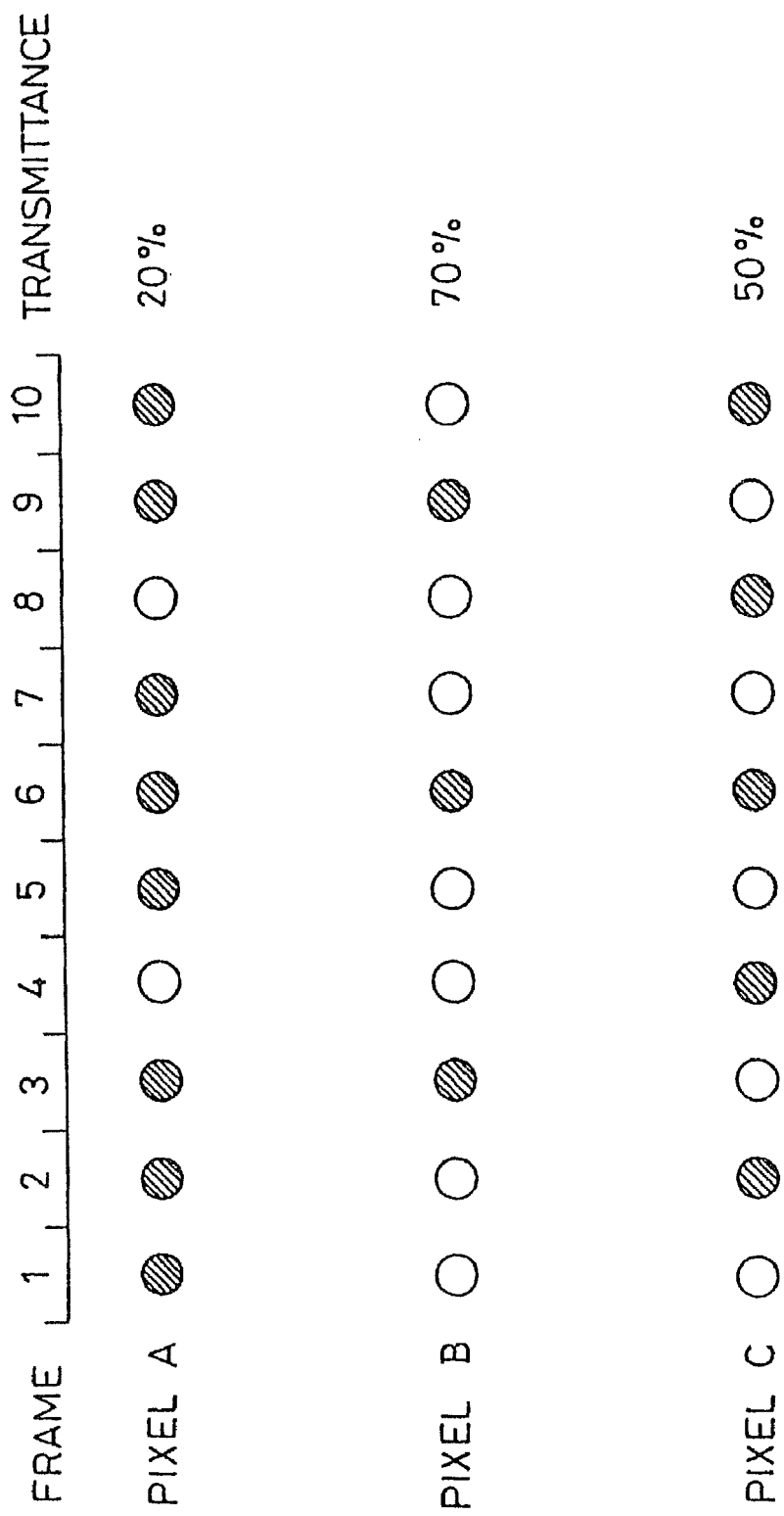

ELECTRO-OPTICAL DEVICE AND METHOD FOR DRIVING THE SAME

BACKGROUND OF THE INVENTION

1. Field of the Invention

The present invention relates to an electro-optical device, e.g. to an active liquid crystal electro-optical device, in particular, to a device provided with two complementary thin film insulated gate field effect transistors (hereinafter referred to as C/TFTs) having a structure of modified transfer gate MTG).

Also, the present invention relates to a method for driving an active electro-optical device, in particular, to a method for driving an active electro-optical device with clear gradation level in a digital mode.

2. Description of the Prior Art

An active liquid crystal electro-optical device utilizing TFT is conventionally know. In this device, an amorphous or polycrystalline semiconductor is used for TFT, while either one of conductive type alone is used for each picture element thereof. Namely, an N-channel TFT (referred to as NTFT) is generally linked to the picture element in series.

Since the dielectric constant in a direction parallel to a molecular axis of the liquid crystal composition provided between substrates is different from that in a direction perpendicular thereto due to the material property thereof, arrangement of the composition con easily be made in both directions, horizontally or vertically, to the outside electric field. By utilizing the anisotropy of dielectric constant, the amount of transmitted light or of dispersion thereof is controlled in a liquid crystal electro-optical device, so as to perform on/off display.

FIG. 3 shows an electro-optic property of nematic liquid crystal. When the applied voltage is small, which is indicated by Va or a point A, the amount of transmitted light is approximately 0%, and at Vb or point B, it is approximately 20%, while at Vc or point C, it is approximately 70%, and at Vd or point D, it amounts to approximately 100%. Therefore, when the points A and D alone are used, two-graded display in black-and-white is possible, while, when the points B, C, or the points where electro-optical property (transmittance) rises in FIG. 2, are used, the display of intermediate gradation is possible.

As for the conventional electro-optical device utilizing TFTs, gradation display was performed by varying the voltage applied to a gate or the TFT or that applied between source and drain thereof, and controlling the voltage in an analogue mode.

Concerning the conventional method of gradation display in the electro-optical device utilizing TFT, an explanation will be made: an N-channel thin film transistor used for the conventional electro-optical device has the voltage-current characteristic as shown in FIG. 3, which shows the voltage-current characteristic of the N-channel thin film transistor utilizing amorphous silicon, and of that utilizing poly-silicon.

By controlling the voltage applied to a gate electrode of the thin film transistor having such characteristic in an analogue mode, drain current can be controlled and therefore strength of the electric field to be applied to the liquid crystal can be varied, whereby gradation display is possible.

In the case of an electro-optical device having picture elements of, for example, 640×400 dots, however, it is difficult to manufacture all 236,000 TFTs without variation in characteristics thereof. It is thought that 15 gradation levels are limit of the number of gradation levels of such electro-optical device having 640×400 picture elements in order to achieve productivity and yield required for practical process.

A gradation display may be performed by predetermining the value of gate voltage, while controlling only the turning of ON/OFF by gate voltage, and by variably controlling source or drain voltage. In this case, however, about 16 gradation levels are considered to be a limit, based on the fact that the characteristic are unstable. In an analogue mode of the gradation display control, clear display was difficult due to variation in characteristics of TFT.

Another method of gradation display using multiple frames is suggested. As shown in the outline indicated in FIG. 11, when a gradation display is to be performed using, for example 10 frames, by making two frames out of ten transparent, while the remainder of eight frames nontransparent, average 20% of transparency can be displayed at picture element A. A picture element B displays 70% of transparency on an average in the same manner, while a picture element C 50% of transparency on an average.

When such a display is carried out, however, since the number of frame is practically reduced thereby, flickering and display failure were generated. To solve the problem, the increasing of frame frequency, or the like, is suggested, whereas, the increase in power to be consumed in accordance with the increase in driving frequency, as well as the difficulty in the achievement of higher operation speed IC, indicated a limit of this method.

BRIEF SUMMARY OF THE INVENTION

An object of the present invention is to provide a method of compensating the variation in characteristics of TFT by inputting a reference signal repeated in a certain cycle and having signal level which varies during duration, of the reference signal, from a controller side, in order to clarify the level of applied voltage, and by controlling the time of connecting the reference signal to the TFT by digital value, and thereby controlling the voltage to be applied to the TFT. namely, to offer an electro-optical device by using complementary thin film transistors (C/TFTs) having a structure of modified transfer gate (MTG) that performs digital gradation display.

The method is characterized in displaying gradation in an electro-optical device using a display drive method that has a display timing in relation to a time F for writing one picture plane and a time (t) for writing in one picture plane, without changing the time F, by applying a reference signal that has voltage variation in a cycle that is equal to the time (t) to one of the signal lines that are used for drive and selection of a picture element, as well as a selection signal at a certain timing within the time (t), to the other signal line, thereby determining the voltage to be applied to a liquid crystal, and thereby actually applying the voltage to the picture element.

In addition, the method is also characterized in high speed control without being limited by several tens of MHz that was a limit of data transfer speed for a conventional CMOS, since the timing is not dependent upon the transfer of the data, but is processed at a part for signal process. with a high speed clock being added to a driver IC itself that is put on the electro-optical device.

FIG. 1 shows a concrete drive waveform for driving the electro-optical device in accordance with the present invention. The electro-optical device has a circuit configuration equivalent to a circuit diagram having a 2×2 matrix form shown in FIG. 4. Herein used is a half wave of a sine wave, as the reference signal waveform of varied voltage in a certain period of time as described supra. Sine waves 303, 310 are applied to $V_{DD_1}$303, $V_{DD_2}$304 that fall in a direction of a scanning line, while two-polarity (hereinafter referred to as bipolar) signals are applied to $V_{GG1}$ 301, $V_{GG2}$ 302 that fall in a direction of information line. Digital control is carried out by a timing of applying the bipolar signals.

Namely, the amount of charge to be accumulated at the point A as well as electric potential at the point A are determined by changing the timing for selecting the signal of varied voltage in a certain period of time, as shown in 309 and 310, and the size of the electric field to be applied to the picture element as well as to the liquid crystal is determined by defining a certain value for the electric potential 313 of a counter electrode.

The timing of applying the bipolar signal to gate signal lines such as $V_{GG1}$, $V_{GG2}$ is not determined by the transfer speed of the information signal, but is regulated by the reference clock input to the driver IC that is directly connected to the electro-optical device in the present invention. Namely, in the case of an electro-optical device of 640×400 dots, drive frequency is approximately 20 MHz based on the limitation of CMOS, and, in order to calculate the number of gradation levels by utilizing this value, the drive frequency is to be indicated as a product of the number of scanning lines, the number of frames, the bipolar pulse, and the number of gradation levels, from which 20 MHz is divided by (400×60×2), to obtain the number of gradation levels which is 416, and it is needless to say that a display having 832 gradation levels is possible by dividing the display screen into two.

The present invention is characterized in performing gradation display in a digital method, instead of employing the conventional analogue method of gradation display. To obtain the effect, in the case of an electro-optical device having picture elements of 640×400 dots, it is very difficult to eliminate the variation in characteristics for all the TFTs of 256,000, at the time of manufacturing, and, practically, in consideration of mass production and yield, 16 gradation display is supposed to be a limit, whereas, the method of compensating the variation in characteristics of TFTs is employed in the present invention by inputting a reference signal from a controller side, in order to clarify the level of applied voltage, and by controlling the timing of connecting the reference signal to TFT by digital value, and thus controlling the voltage to be applied to TFT, which allows for clear digital gradation display.

Also, clear digital gradation display is possible without changing the number of frames for one picture plane, by defining two kinds of drive frequency, whereby the generation of flickering concomitant with the decrease in the number of frames can be prevented.

For example, when a gradation display is performed in a normal analogue mode for an electro-optical device, for which 256,000 pairs of TFTs of 640×400 dots are formed in 300 nm square, a 16-gradation display is an upper limit due to the variation in TFT characteristics of approximately ±10%. In the case of digital gradation display in accordance with the present invention, however, since the variation in characteristics of TFT devices can be compensated, a 256-gradation display is possible, and a various and subtle color display of as many as 16,777,216 kinds of colors are possible thereby. When a software such as a television image is to be projected on the screen, for example, the projection of a "rock" scene of the same color requires subtle difference in colors due to the existence of slight recesses and the like thereon, and the 16-gradation display is not suitable for the display as close to the natural coloration ion as possible. However, the subtle variation in tone can be displayed by the gradation display in accordance with the present invention.

BRIEF DESCRIPTION OF THE DRAWINGS

The accompanying drawings, which are incorporated in and form a part of the invention and together with the description, serve to explain the principle of the invention.

FIG. 6 corresponding to FIG. 5 shows the arrangement of an active matrix electro-optical device applicable to the present invention.

FIG. 11 shows a concept of gradation display in accordance with the conventional method.

DETAILED DESCRIPTION OF THE PREFERRED EMBODIMENTS

Preferred Embodiment 1

Figure 5:
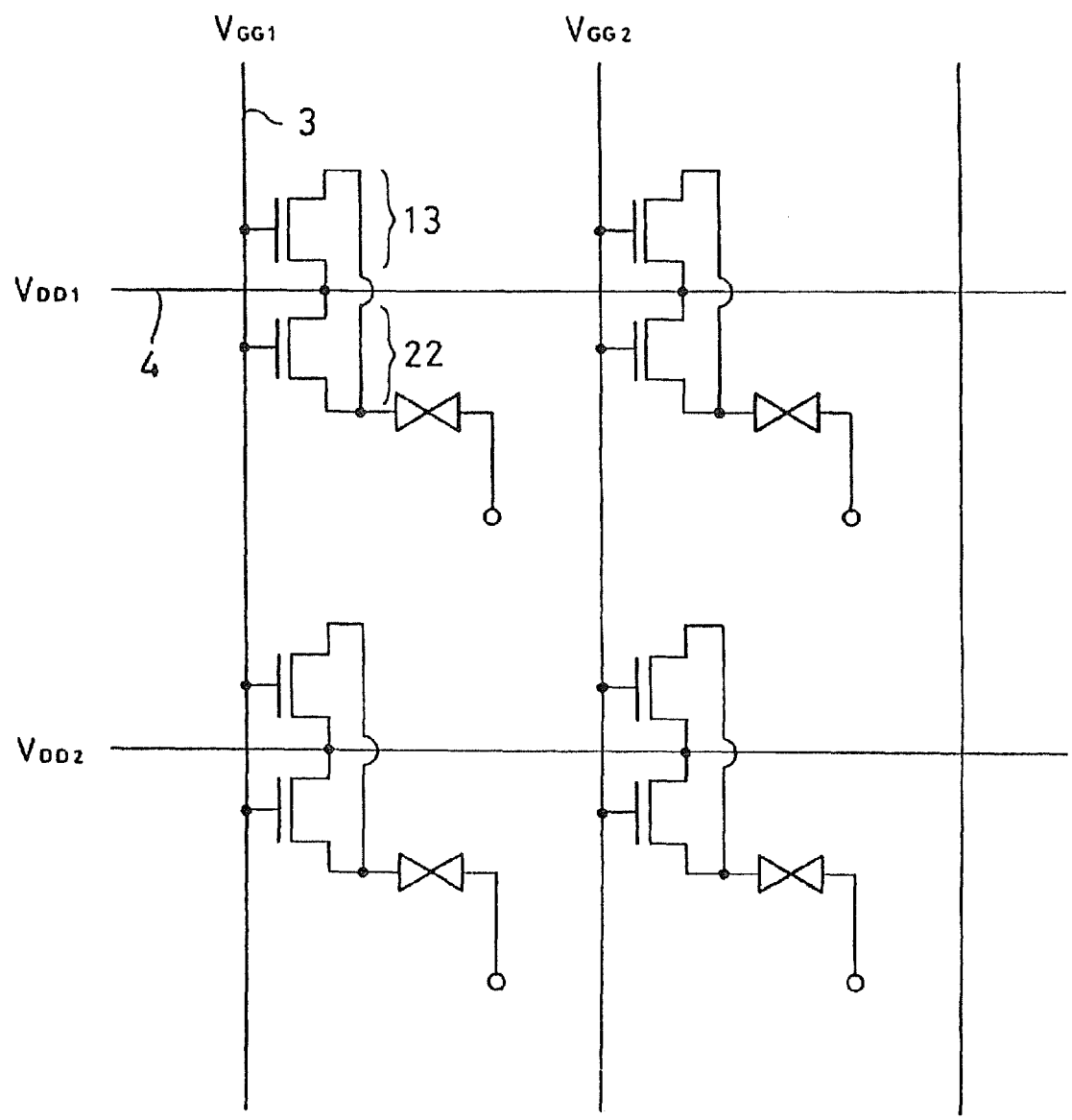
FIG. 5 shows an example of a circuit of an active matrix electro-optical device applicable to the present invention, subject to a part of 2×2 matrix structure.

In this embodiment, a wall television is manufactured by using the liquid crystal display device having the circuit structure as shown in FIG. 5, which will be described infra. The manufacturing process of the TFT employed as an active device of the electro-optical device is shown in FIGS. 7 (A) through (I). Polycrystalline silicon that is subjected to laser annealing process is used as a semiconductor material that forms the TFT.

Figure 1:
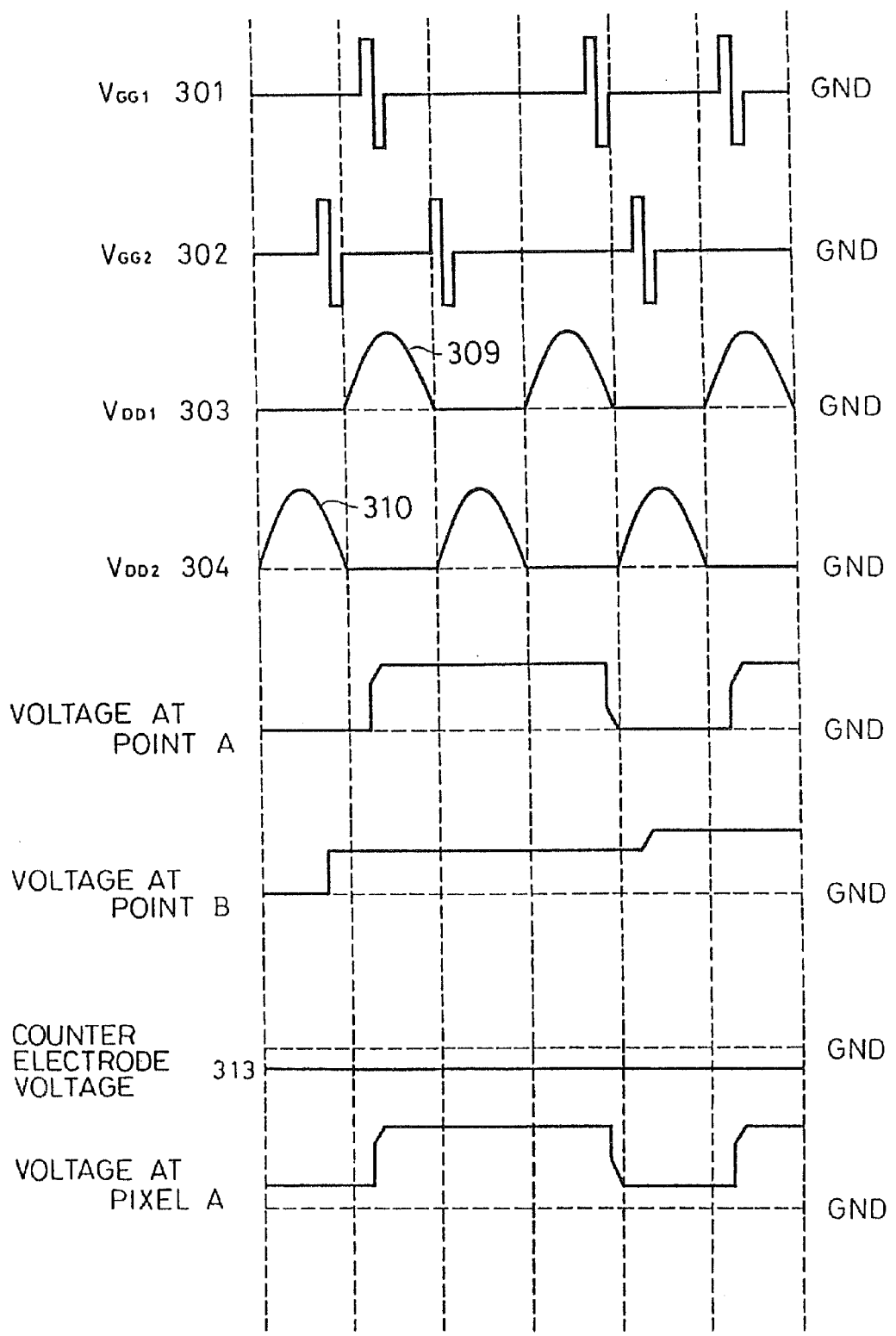
FIG. 1 shows an example of a drive waveform in accordance with the present invention.
Figure 2:
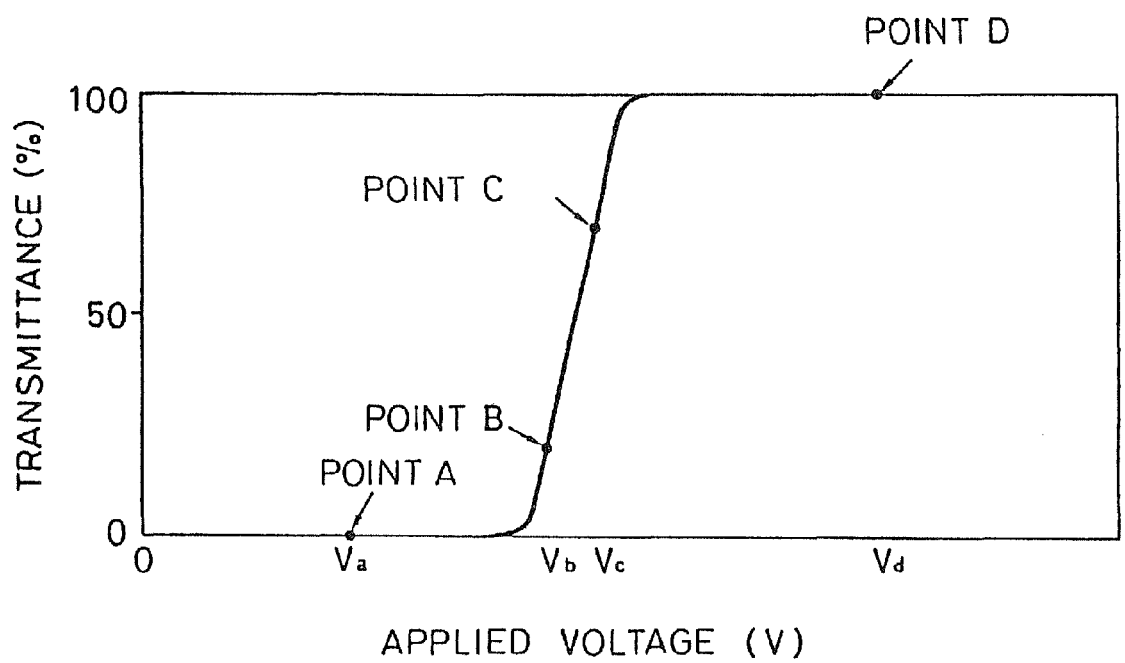
FIG. 2 shows an electric photo-optical characteristic of the conventional electro-optical device.
Figure 3:
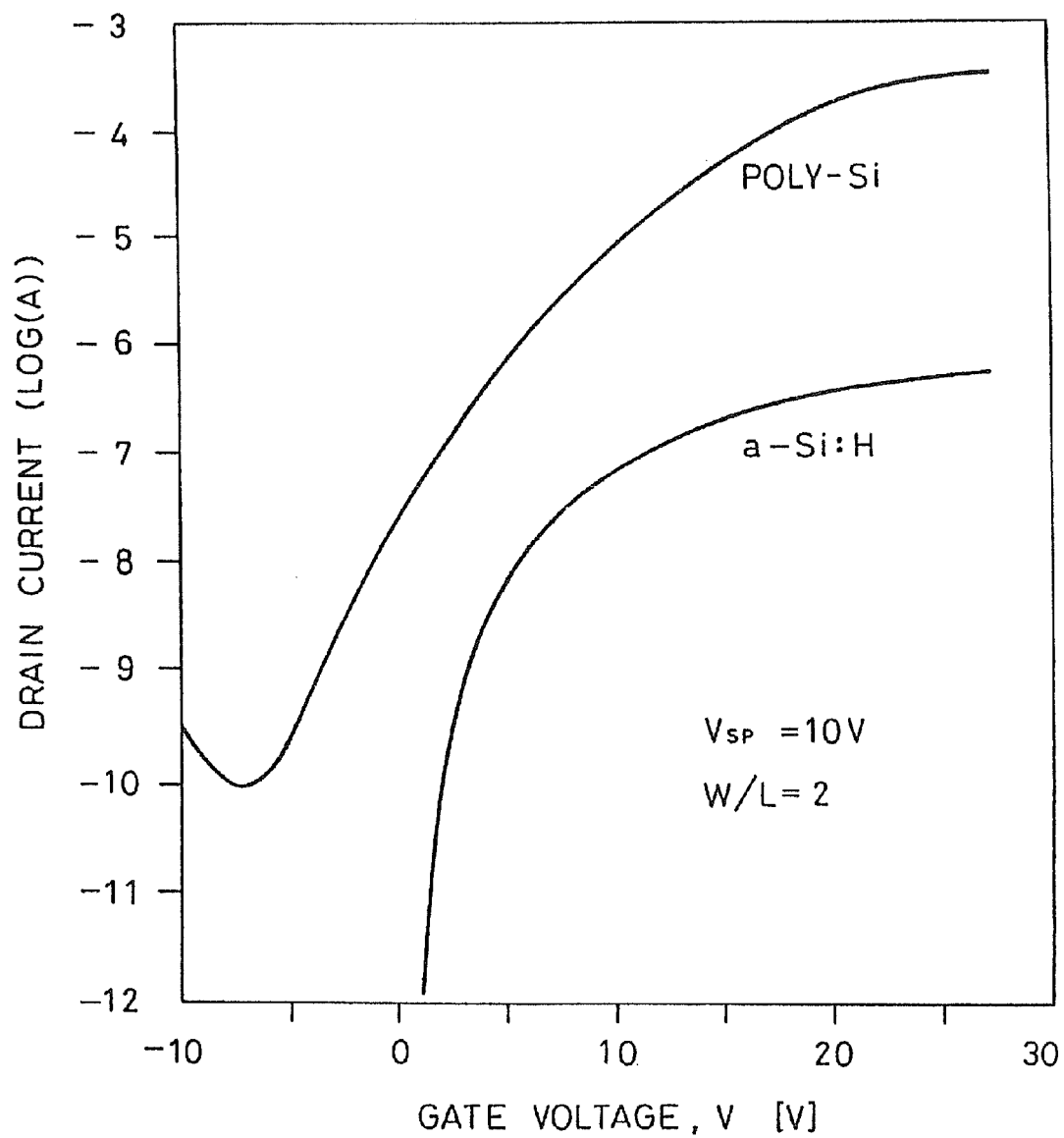
FIG. 3 shows a current-voltage characteristic of TFT in the case poly-silicon and amorphous silicon are adopted as materials used for the TFT.

The arrangement of the electrode, etc. of the actual electro-optical device corresponding to the circuit structure is shown in FIG. 6, which shows only a part corresponding to 2×2 or less thereof for simplification. The drive signal waveform that is actually used therefore is shown in FIG. 1, which also shows the signal waveform of 2×2 matrix form for simplification.

Referring to FIG. 7, the manufacture of the liquid crystal panel used in accordance with the preferred embodiment 1 will be described. Referring to FIG. 7(A), a silicon oxide film is manufactured to a thickness of 1000-3000 angstroms as a blocking layer 51, by magnetron RF (high frequency) sputtering, on the glass 50, which is not expensive, and which endure the heat treatment of not more than 700° C., e.g. of approximately 600° C., under the process condition of oxygen 100% atmosphere, deposition temperature of 15° C., output of 400 to 800 W, and the pressure of 0.5 Pa. The deposition rate was 30 to 100 angstroms/minute when quartz or single crystalline silicon was used as a target.

An intrinsic, or substantially intrinsic silicon film 52 was manufactured by plasma CVD thereupon. The deposition temperature ranged from 250° C. to 350° C., and it was 320° C. in the preferred embodiment 1, using mono-silane ($SiH_4$) as a reactive gas, which can be replaced with disilane ($Si_2H_6$) or trisilane ($Si_3H_8$). These were introduced in a PCVD device, and deposition was carried out by applying high frequency power of 13.56 MHz under the pressure of 3 Pa. The suitable high frequency power is 0.02 to 0.10 W/cm$^2$, while 0.055 W/cm$^2$ was adopted in the preferred embodiment 1. The flow of mono-silane ($SiH_4$) was 20 SCCM, and the deposition rate at the time was approximately 120 angstroms/minute. Boron can be added to the deposited film at a concentration of $1 \times 10^{15}$ to $1 \times 10^{18}$ cm$^{-3}$ using diborane during the deposition, in order to control the threshold voltage (Vth) almost equal between PTFT and NTFT. Sputtering or low pressure CVD can be employed instead of the plasma CVD for the deposition of the silicon layer that will be a channel region of TFT, and the methods will be described below in simplified manner.

In the case of sputtering, the back pressure before sputtering was no more than $1 \times 10^{-5}$ Pa, and the sputtering was performed using a single crystalline silicon as a target, in the atmosphere in which 20-80 ? % of hydrogen was added to argon: e.g. 20% of argon and 80% of hydrogen. The deposition temperature was 150° C., and the frequency was 13.56 MHz, while the sputtering output was 400-800 W, and the pressure was 0.5 Pa. In the case of low pressure CVD, deposition was carried out by supplying disilane ($Si_2H_6$) or trisilane($Si_3H_8$) to a CVD device, at a temperature of 450-550° C., 100 to 200° C. lower than that for crystallization, e.g. at 530° C. The pressure inside of the reactor was 30-300 Pa, while the deposition rate was 50-250 angstroms/minute.

Oxygen in the film formed in these manner is preferably not more than $5 \times 10^{21}$ atoms·cm$^{-3}$. It is preferred that the oxygen concentration be not more than $7 \times 10^{19}$ atoms·cm$^{-3}$, desirably no more than $1 \times 10^{19}$ atoms·cm$^{-3}$, in order to promote crystallization, however, if it is too low, current leakage under the OFF condition of TFT is increased due to the illumination of the back light of the electro-optical device, whereas, if it is too high, crystallisation becomes difficult, and thus laser annealing temperature must be increased or the laser annealing time must be prolonged. The concentration of hydrogen was $4 \times 10^{20}$ atoms·cm$^{-3}$, and is one atom % compared to the silicon supposed to be $4 \times 10^{22}$ atoms·cm$^{-3}$.

The oxygen concentration can be not more than $7 \times 10^{19}$ atoms·cm$^{-3}$ or desirably no more than $1 \times 10^{19}$ atoms·cm$^{-3}$, so as to promote crystallization with regard to source or drain and oxygen can be added only to the channel forming region of the TFT that forms pixel, at concentrations of $5 \times 10^{20}$ to $5 \times 10^{21}$ atoms·cm$^{-3}$ by ion implantation.

A silicon film an amorphous condition was formed at 500 to 5000 angstroms in the above-mentioned manner, and at 1000 angstroms in the preferred embodiment 1.

Referring to FIG. 7 (B), a photoresist pattern 53 is formed with openings formed only on the source and drain regions in the photoresist pattern using a mask P1. A silicon film 54 was manufactured thereon, which is to be an n-type activation layer, by plasma CVD, at the deposition temperature of 250° C. to 350° C., e.g. 320° C. in the preferred embodiment 1, using mono-silane ($SiH_4$) and 3% concentration of phosphine ($PH_3$) of mono-silane bass. These were introduced in the PCVD device at a pressure of 5 Pa, and the deposition was carried out by applying a high frequency power of 13.56 MHz. The suitable high frequency power is 0.05-0.20 W/cm$^2$, and it was 0.120 W/cm$^2$ in the preferred embodiment 1.

The electric conductivity of the n-type silicon layer formed in the above-mentioned manner was approximately $2 \times 10^{-1}$ [(Ω·cm)$^{-1}$], while the film thickness was 50 angstroms. The resist 53 was then removed by lift-off method, so as to form source, drain regions 55, 58.

A p-type silicon semiconductor layer was formed using the same process. Mono-silane ($SiH_4$) and 5% concentration of diborane ($B_2H_6$) of mono-silane base were used as the introduction gas. These were introduced in the PCVD device at a pressure of 4 Pa, and deposition was carried out by applying a high frequency power of 13.56 MHz. The suitable high frequency power is 0.05 to 0.20 W/cm$^2$, and 0.120 W/cm$^2$ was adopted in the preferred embodiment 1. The electric conductivity of the p-type silicon layer formed in this manner was approximately $5 \times 10^{-2}$ [(Ω·cm)$^{-1}$], while the film thickness was 50 angstroms. Source, drain regions 59, 60, were formed by using the lift-off method in the same manner as the n-type region. The silicon film 52 was then etched off, using a mask P3, and an island region 33 for N-channel thin film transistor as well as an island region 64 for P channel thin film transistor were formed.

The source, drain and channel regions were laser-annealed using XeCl excimer laser, while a laser doping was carried out to the activation layer. As for the laser energy at the time, a threshold energy was 130 mJ/cm$^2$, whereas 220 mJ/cm$^2$ was required so as to melt the entire film thickness. When the energy of no less than 220 mJ/cm$^2$ is irradiated from the start, hydrogen included in the film is abruptly ejected, whereby the film is damaged. For that reason, melting has to be carried out after the hydrogen is primarily purged at a low energy. In the preferred embodiment 1. after the hydrogen was at first purged at 150 mJ/cm$^2$, crystallization was carried out at 230 mJ/cm$^2$.

By the annealing, the silicon film is transformed from an amorphous structure to the state of higher order, with a part thereof being crystallized. In particular, a relatively higher order region of the silicon coated film tends to be crystallized into a crystalline region by the annealing. However, silicon atoms are pulled with each other since bonds are formed between such regions by silicon atoms existing therebetween. Laser Raman Spectroscopy results show a peak shifted to the frequency lower than the single crystalline silicon peak of 522 cm$^{-1}$. The apparent grain diameter was calculated 50 to 500 Å, based on a half band width, however, in fact, the film comprises a lot of high crystalline regions which constitute a cluster structure, and clusters are anchored to each other in the film by bonds between silicon atoms.

As a result, it can be said that substantially no grain boundary (hereinafter referred to as GB) exists in the film. Since carriers can easily move between the respective clusters, through the anchored portions, a carrier mobility higher than that of a poly-crystalline silicon in which a GB obviously exists, is achieved. Namely, Hall mobility ($\mu$h) of 10-200 cm$^2$/Vsec, electron mobility ($\mu$h) of 15-300 cm$^2$/VSec can be obtained.

A silicon oxide film was formed as a gate insulating film thereon in the thickness ranging from 500 to 2000 Å, e.g., at 1000 Å, under the same condition as that for the manufacturing of the silicon oxide film as a blocking layer. At the time of forming the film, a small amount of fluorine may be added thereto, so as to stabilize sodium ion.

Figure 7A:
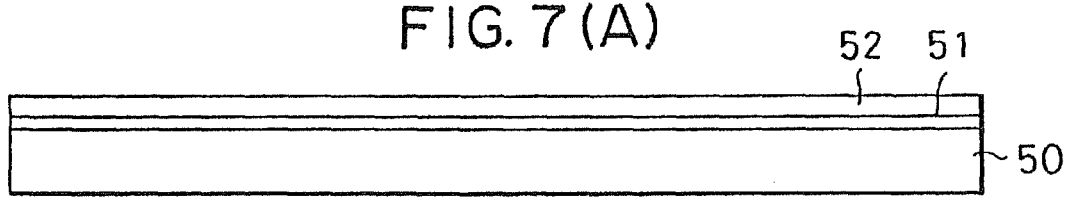
FIGS. 7(A) to (I) corresponding to the first preferred embodiment, show schematic cross sectional views indicating the manufacturing process of the TFT applicable to the present invention.
Figure 7B:
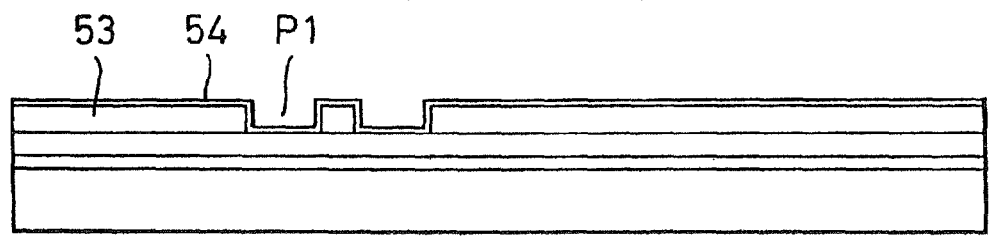
Figure 7C:
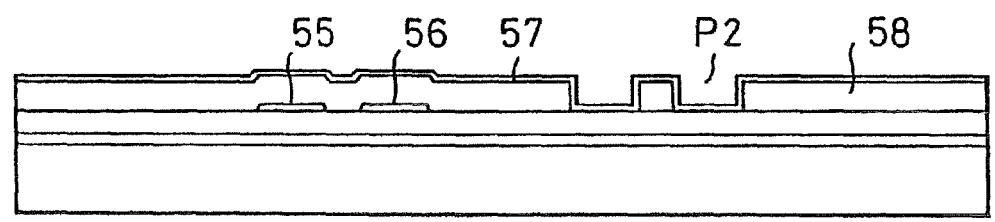
Figure 7D:
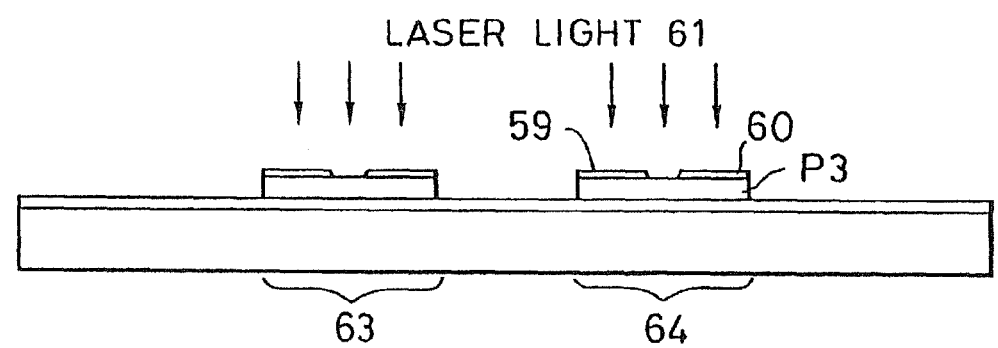
Figure 7E:
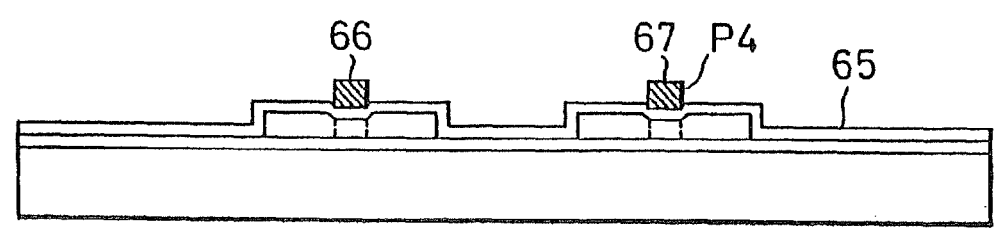

Further, on the upper surface thereof, a silicon film doped with phosphorus at 1 to 5×10$^{21}$ atoms·cm$^{-3}$, or a multi-layered film comprising this silicon film and molybdenum (Mo), tungsten (W), MoSi$_2$ or WSi$_2$ film formed thereupon, was formed, which was then subjected to a patterning process using a fourth photomask P4, and the structure shown in FIG. 7(E) was thereby obtained. A gate electrode 56 for NTFT, as well as a gate electrode 67 for PTFT ware formed: e.g. a channel length of 7 $\mu$m; and as a gate electrode P-doped Si of 0.2 $\mu$m on which molybdenum was formed at 0.3 $\mu$m.

In the case aluminum (Al) is used as a gate electrode material, after patterning the gate electrode material by a fourth photomask 69, anodic oxidation can be applied to the surface thereof. In this case, a self-aligning process can be employed, whereby the contact hole of a source and drain can be formed closer to the gate, and the TFT characteristic can be further improved thereby, due to the improved mobility as well as the reduction in threshold voltage.

In this way, C/TFT can be manufactured without elevating the temperature not less than 400° C., in every process. Therefore, it is not necessary to use an expensive material such as quartz for the substrate, and it can be said that this is a most suitable process for manufacturing the wide-screen liquid crystal display device in accordance with the present invention.

Figure 7F:
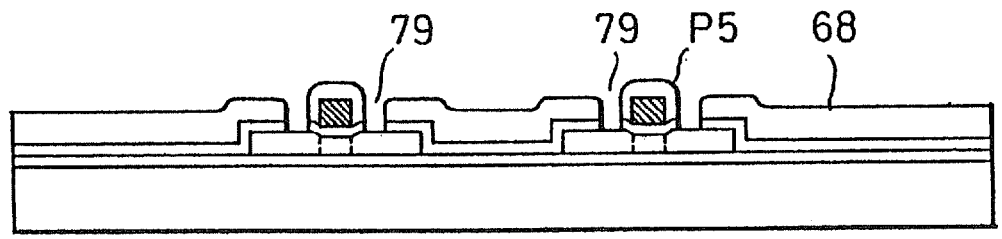
Figure 7G:
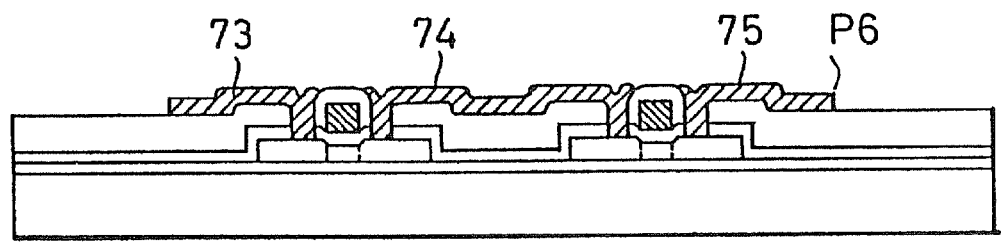
Figure 7H:
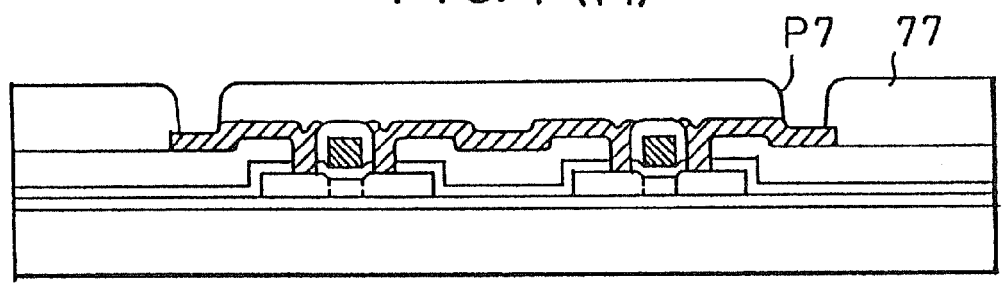
Figure 7I:
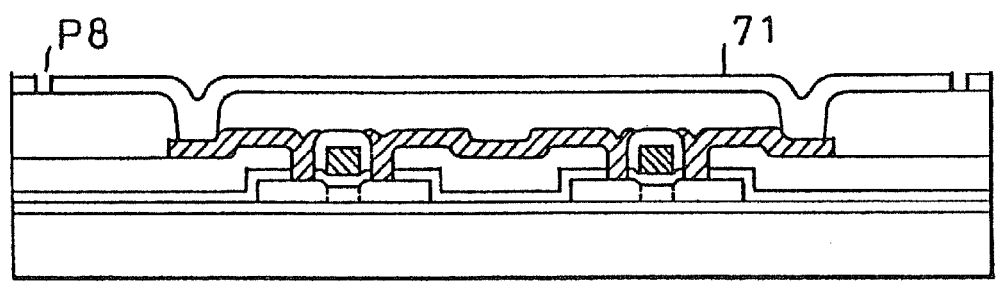

Referring to FIG. 7(F), an inter-layer insulating material 68 was sputtered, so as to form a silicon oxide film, in the manner described supra. The silicon oxide film can be formed by LPCVD, photo-CVD, or by atmospheric pressure CVD, at a thickness of, for example, 0.2 to 0.6 $\mu$m, and thereafter, an opening 79 for electrode was formed using a fifth photomask P6. In addition, after aluminum was formed by sputtering at a thickness of 0.3 $\mu$m thereupon, while a lead 74 as well as contacts 73, 75 were manufactured using a sixth photomask P6, an organic resin 77 for flattening, for example, a translucent polyimide resin was applied to and farmed on the surface, and an opening for electrode was formed again by a seventh photomask P7. An ITO (indium tin oxide) was formed en the surface thereof, at a thickness of 0.1 $\mu$m by sputtering, and a picture element electrode 71 was formed using an eighth photomask P8. The ITO was formed at a temperature ranging from room temperature to 150° C., and was subjected to annealing process at 200-400° C. in oxygen or atmosphere.

The electric characteristics of P-TFT thus obtained were: mobility of 40 (cm$^2$/Vsec), Vth of −5.9 (V), while those of NTFT were: mobility of 80 (cm$^2$/Vsec), and Vth of 5.0 (V).

In this manner, one substrate for the electro-optical device manufactured in accordance with the present invention, was obtained.

The wirings of the electrode, etc., of the liquid crystal display device are shown in FIG. 6. An N-channel thin film transistor and a P-channel thin film transistor are provided on the intersection of a first signal line 3 and a second signal line 4, whereby the device has a matrix structure with the use of a modified TG type C/TFT. TFT 13 is connected to the second signal line 4 through a contact of an input terminal of a drain 10, while a gate 9 is connected to the first signal line 3. The output terminal of a source 12 is connected to an electrode 17 of the picture element through a contact.

On the other hand, regarding PTFT 22, the input terminal of a drain 20 is connected to the second signal line 4 through a contact, while a gate 21 is connected to the signal line 3, and the output terminal of a source 18, to the picture element electrode 17 through a contact, in the same manner as NTFT. By repeating such a structure horizontally and vertically, the liquid crystal display device having picture elements as many as 540×480, 1280×980, or 1920×400 in this embodiment, can be obtained.

In this way, a first substrate of a pair of substrates was obtained.

The manufacturing method of the other, or a second substrate is shown in FIG. 12. A striped color filter is provided on the substrate corresponding to each picture element. The polyimide resin mixed with black pigment was formed on a glass substrate at a thickness of 1 $\mu$m, by spin coating, and a black stripe 81 was formed using a ninth photomask P9. Then, the polyimide resin mixed with a red pigment was formed at 1 $\mu$m by spin-coating, and a red filter 83 was formed using a tenth photomask P10. A green filter 85 and a blue filter 86 were formed is the same manner, using masks P11, P12. Each filter was baked in nitrogen for sixty minutes, at a temperature of 350° C. during the manufacture thereof. A leveling layer 89 was then manufactured using transparent polyimide, again by spin coating.

An ITO (indium tin oxide) was then formed on the entire filter at a thickness of 0.1 $\mu$m by sputtering, and a common electrode 80 was formed using a fifth photomask P13. The ITO was formed at a temperature ranging from room temperature to 150° C., and was subjected to the annealing process at 200 to 300° C. in oxygen or atmosphere, so as to obtain a color filter layer and the electrode 90 on the second substrate.

A polyimide precursor was printed on the substrate by an offset method, was baked in a non-oxidating atmosphere, e.g. in nitrogen, for an hour, at a temperature of 330° C., and was subjected to a known rubbing method, whereby the surface condition of the polyimide was changed, and a means to allow for a liquid crystal molecule to be oriented in a certain direction at least in the initial stage was provided.

The nematic liquid crystal composition was sandwiched by the first and the second substrates as described above. The periphery of the first and the second substrates is fixed with an epoxy adhesive. A TAB shaped driving IC and a PCB comprising common signal and electric potential wirings are connected to leads provided on the substrate, and a polarizing plate was attached to the outside thereof, so as to obtain a transmission type electro-optical device.

Figure 8:
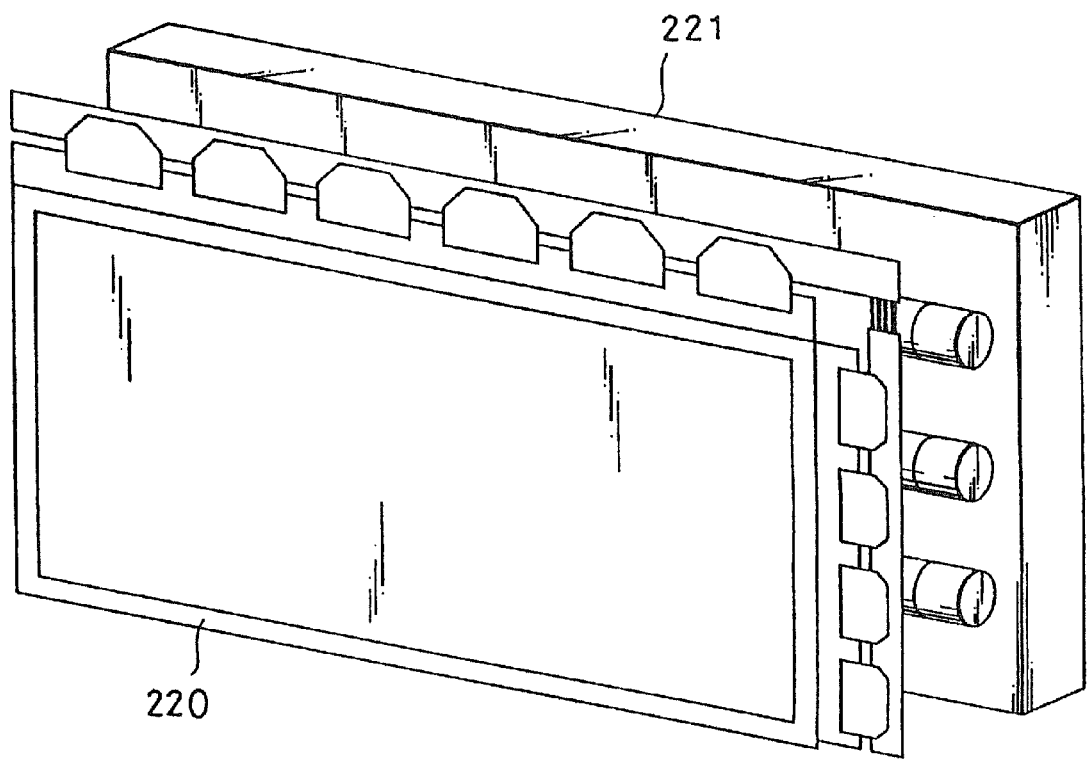
FIG. 8 and FIG. 9 show schematic structure of the display device applicable to the electro-optical device described in the present invention.
Figure 9:
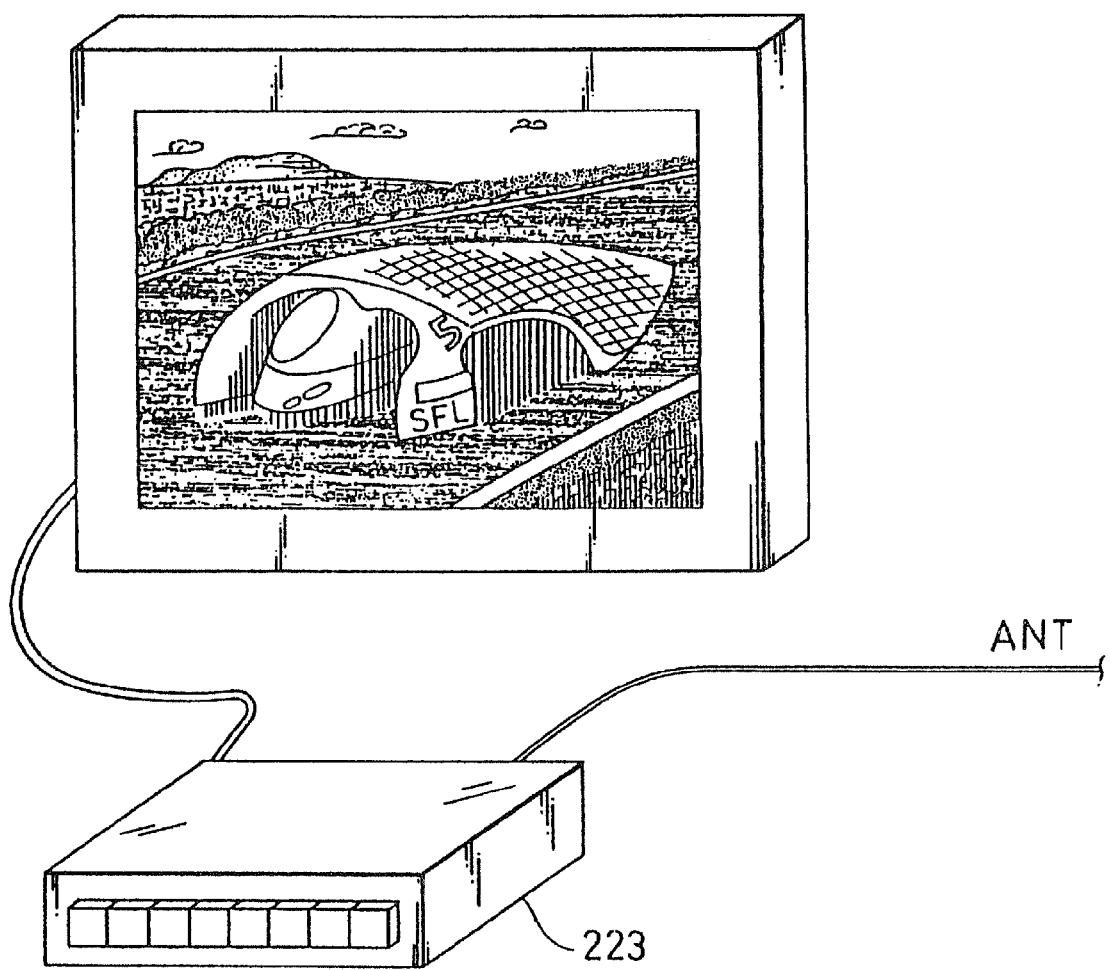

A schematic diagram of the electro-optical device in accordance with this embodiment is shown in FIGS. 8 and 9. The liquid crystal panel 220 manufactured in the processes described above was installed by combining it with a rear part lighting device 221 comprising three pieces of cold cathode tubes arranged thereon, and was then connected to a tuner 223 for receiving television radio wave, so as to complete the electro-optical device. Since the device has a flat shape compared with the conventional one of CRT type, it can be installed on the wall, and the like.

Figure 10:
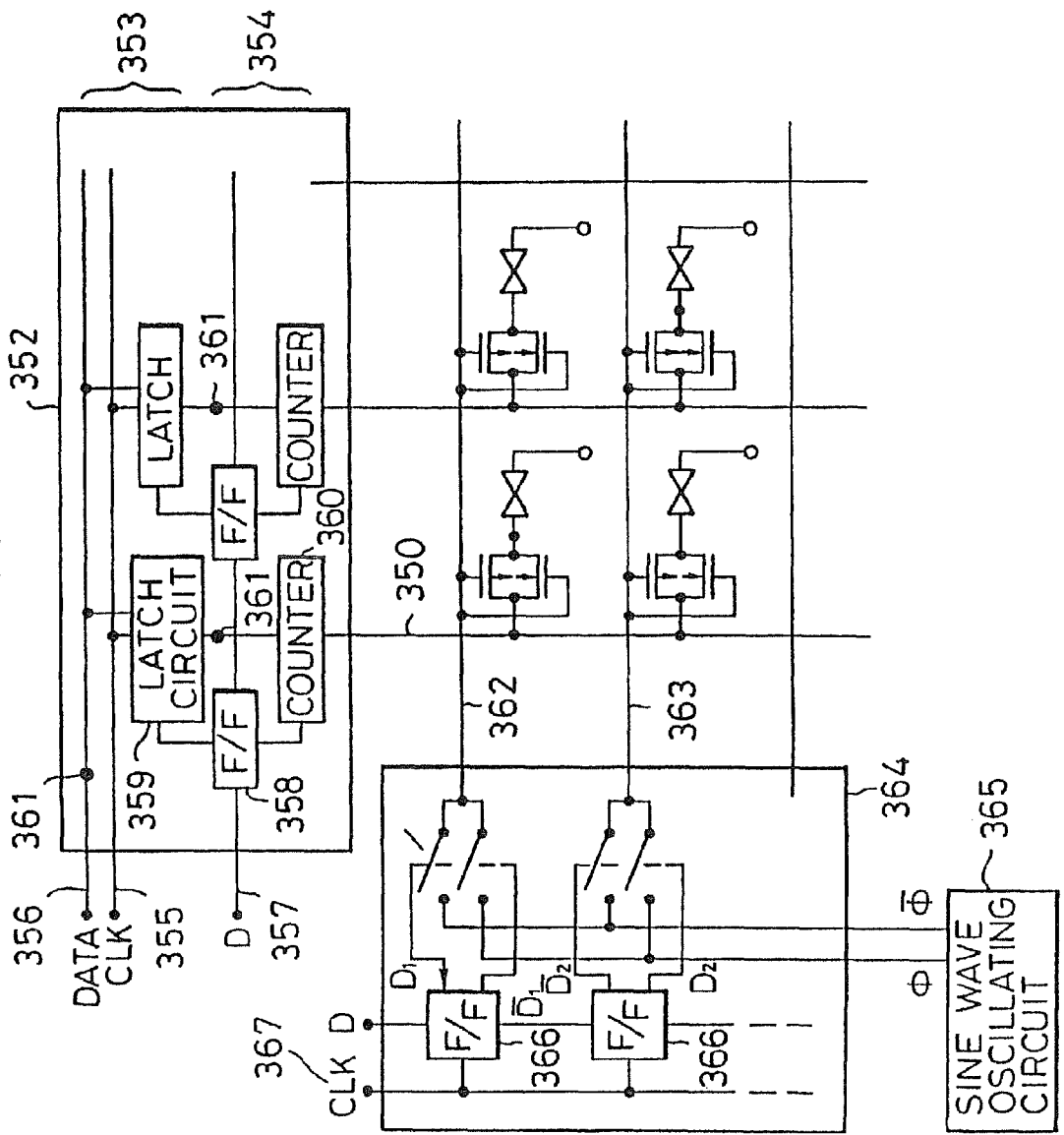
FIG. 10 shows a system structure of a drive circuit for an electro-optical device applicable to the present invention.
Figure 12A:
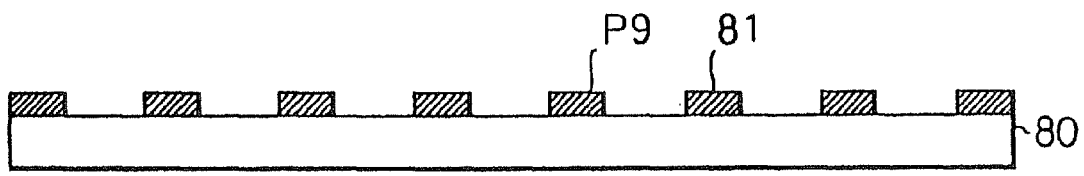
FIG. 12 shows the manufacturing process of forming a color filter on the substrate of the electro-optical device.
Figure 12B:
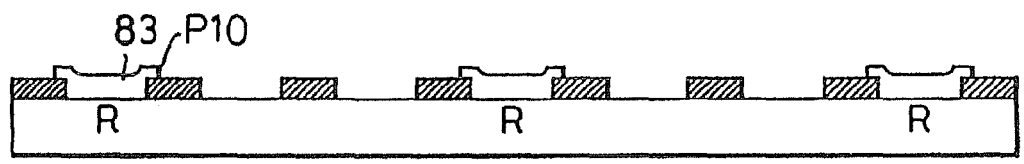
Figure 12C:
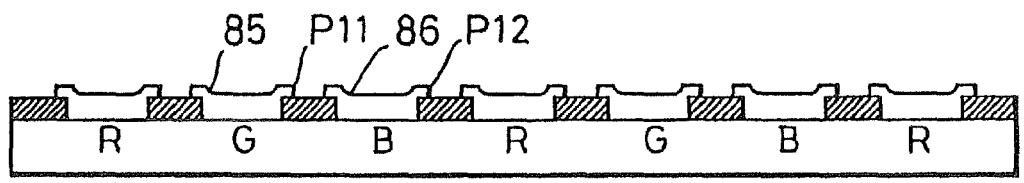
Figure 12D:
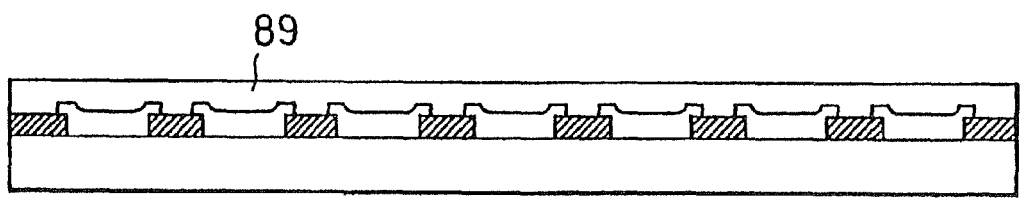
Figure 12E:
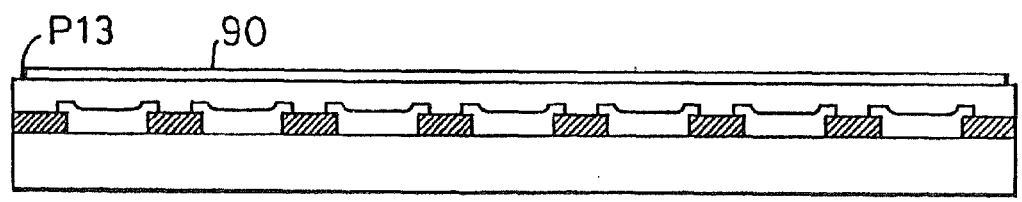

Referring to FIG. 10, the driving peripheral circuit of the electro-optical device in accordance with the present invention will be explained:

A driving circuit 352 is connected to the wirings 350, 351 on the side of an information signal, connected to the matrix circuit of the electro-optical device. The driving circuit 352 comprises two parts when divided by a driving frequency system, i.e. one is a data latch circuit system 353, which is the same as in the conventionally known driving method, and which primarily comprises a basic dock CLK signal circuit 355 for transferring the signals of a data signal circuit 356 in order, performing one bit to twelve bits parallel processing. The other is a part in accordance with the present invention, and comprises a clock 357 corresponding to the degree of division necessary for gradation display, a flip flop circuit 358, and a counter 360. The counter 360 forms a bipolar pulse generation timing corresponding to the gradation display data sent from the data latch system 353. Further, the gradation display data can be controlled in finer way, when a ROM table for converting Δt into sinθ is used between the exit of the latch circuit and a data line 361.

The present invention is characterized in that the clear digital gradation display is possible without changing the number of frames for re-writing the screen, by taking two kinds of driving frequencies. The generation of flickering and the like caused by the decrease in the number of frames can be prevented thereby.

On the other hand, a driving circuit 364 connected to signal lines 363, 362 on a scanning side controls the sine wave transmitted from a sine wave oscillating circuit 365 by a flip flop circuit 356 of a clock CLK, 367, and the select signal is applied to the signal lines 363, 362.

By digitally controlling the timing for cutting the sine wave signal on the scanning side by the bipolar pulse on the information side, gradation display is possible.

When an analogue gradation display is carried out in a normal mode for the electro-optical device comprising, for example, 788,000 pairs of TFTs of 1920×400 dots formed into a 300 mm square, the variation in characteristics of the TFTs becomes ±10% as a whole, and thus a gradation display having 16 gradation levels is an upper limit, whereas, when a digital gradation display is carried out in accordance with the present invention, it is hardly affected by the variation in characteristics of TFTs, and a gradation display having 64 gradation levels is thus possible for the electro-optical device of the same size, while various and subtle expression of 262,144 kinds of colors is achieved in color-display.

Preferred Embodiment 2

The formation of a view finder for a video camera utilizing an electro-optical device having a diagonal of one inch in accordance with this second preferred embodiment 2 will be described below.

Figure 13:
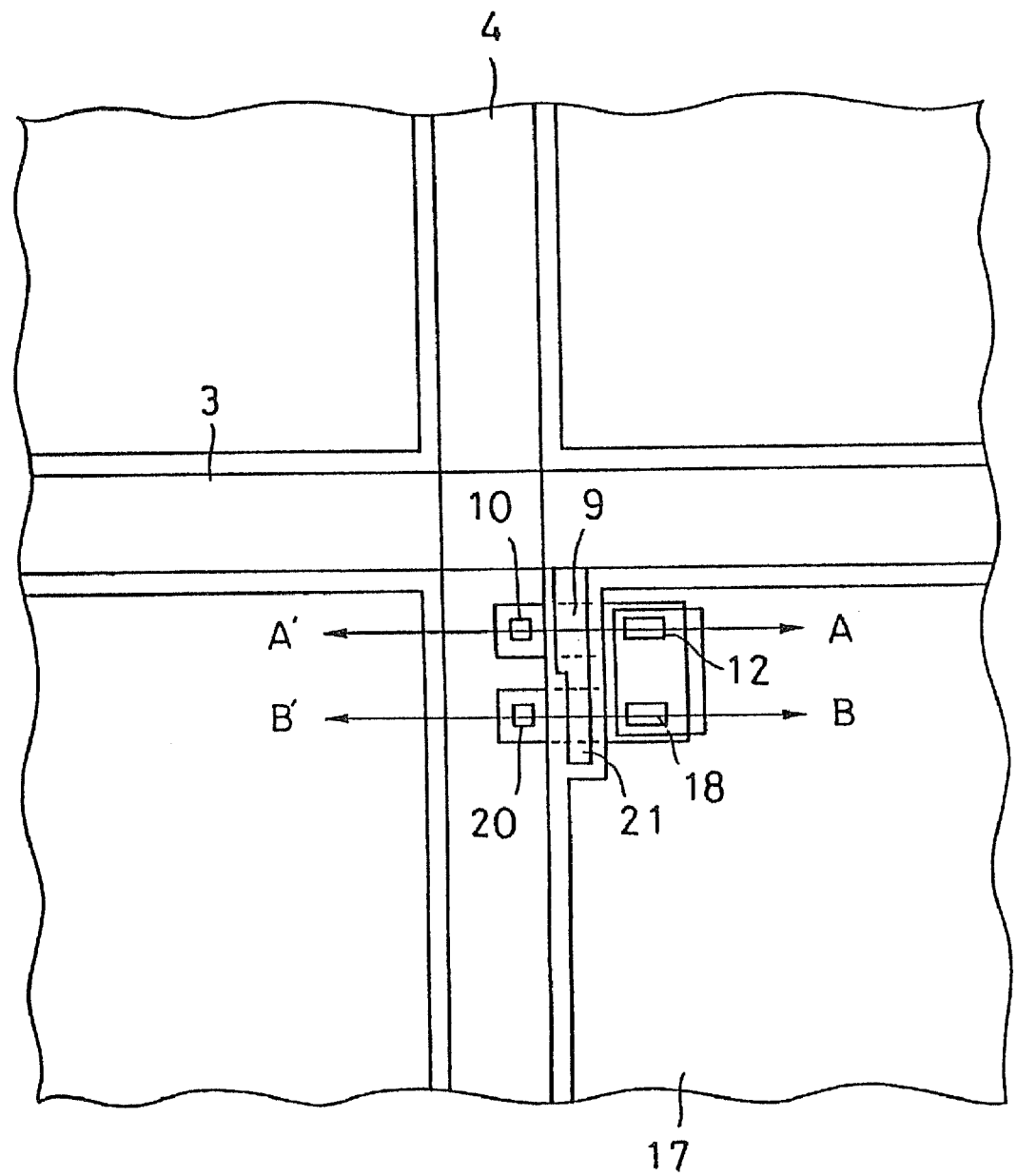
FIG. 13 corresponding to the third preferred embodiment, shows the arrangement of an active matrix electro-optical device applicable to the present invention.
Figure 14:
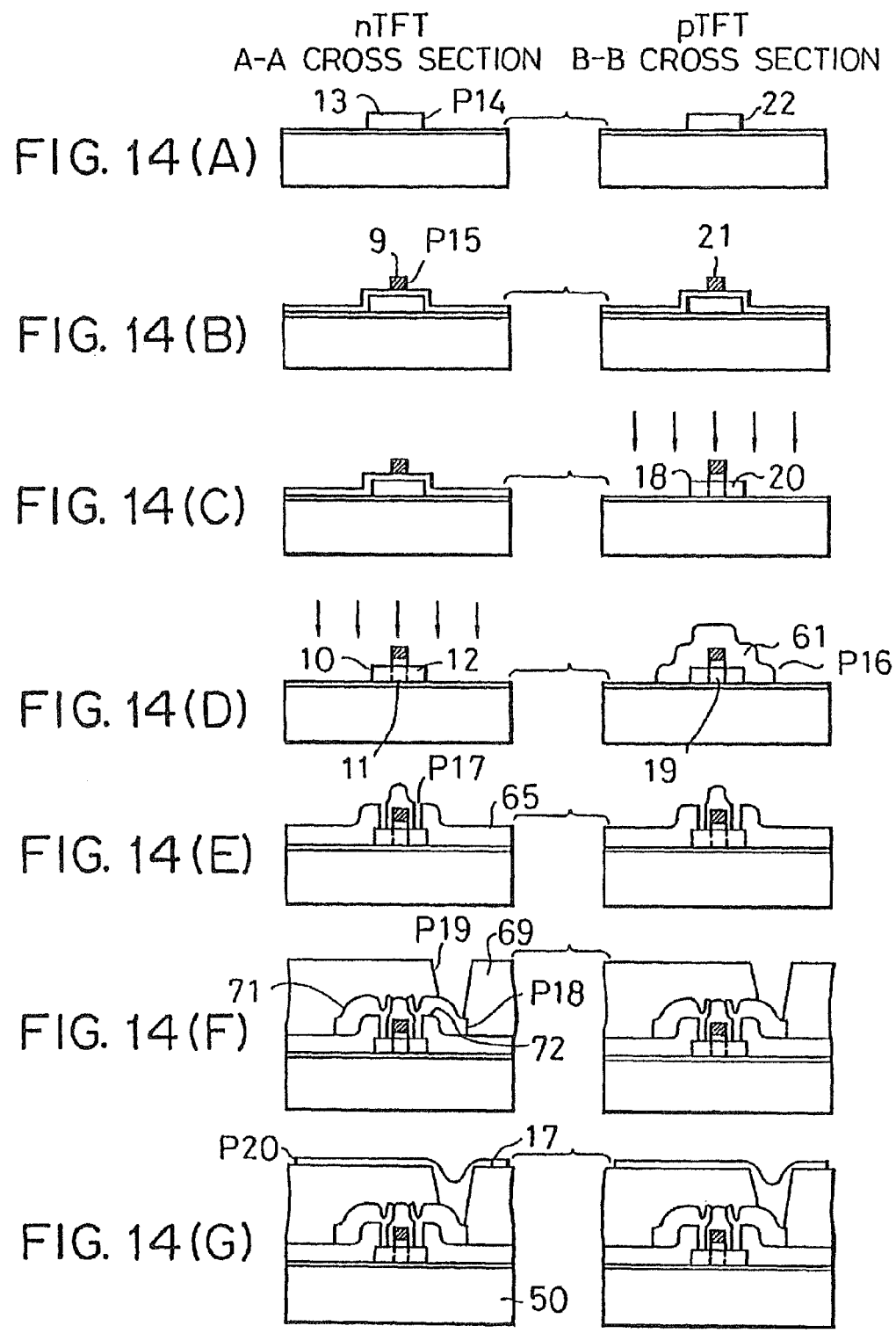
FIGS. 14(A) to (G) corresponding to the second preferred embodiment, show schematic cross sectional views indicating the manufacturing process of the TFT applicable to the present invention.

In this embodiment, the number of picture elements was 357×125, and the device was formed using a high mobility TFT obtained by a low temperature process, so as to form the view finder. The arrangement of the active device on the substrate of the liquid crystal display device used in this embodiment is shown in FIG. 13, and the manufacturing process of the TFT part is shown in FIG. 14 in such a way that each corresponds to A-A' cross section and B-B' cross section shown in FIG. 13. Referring to FIG. 14(A), a silicon oxide film is manufactured at a thickness of 1000 to 3000 Å as a blocking layer 51 by magnetron RF (high frequency) sputtering, on the inexpensive glass substrate 50 that bears heat treatment of no more than 700° C., e.g. approximately 800° C. The conditions for the process are: 100% oxygen atmosphere, formation temperature of 15° C., output of 400 to 800 W, and pressure was 0.5 Pa. The formation rate using quartz or single crystalline silicon as a target was 30 to 100 Å/min.

A silicon film was then formed thereon by LPCVD (low pressure chemical vapor deposition), sputtering, or by plasma CVD. When the low pressure chemical vapor deposition was employed, film formation was carried out by supplying disilane ($Si_2H_6$) or trisilane ($Si_3H_8$) to a CVD device, at a temperature of 450 to 550° C., 100 to 200° C. lower than the temperature for crystallization, e.g. at 530° C. The pressure in a reactor was 30 to 300 Pa, while the film formation rate was 50 to 250 Å/min. Boron may be added to the film using diborane at a concentration of $1\times10^{15}$ to $1\times10^{18}$ atoms·cm$^{-3}$, during the manufacture thereof, in order to control the threshold voltages (Vth) for PTFT and NTFT almost of the same.

In the case of the silicon film formation by sputtering, the back pressure before sputtering was not more than $1\times10^{-5}$ Pa, and the formation was carried out in the atmosphere comprising 20 to 80% of hydrogen mixed with argon; e.g. argon 20% and hydrogen 80%, using single crystalline silicon as a target. The formation temperature was 150° C., and the frequency of high frequency power applied thereto was 13.56 MHz, sputtering output was 400 to 800 W, and the pressure was 0.5 Pa.

Silicon film formation by plasma CVD was carried out at a temperature of, for example, 300° C., using mono-silane ($SiH_4$) or disilane($Si_2H_6$), which were introduced in a PCVD device, and high frequency power of 13.56 MHz was applied thereto, so as to carry out film formation.

Oxygen in the film formed by these methods is preferably not more than $5\times10^{21}$ cm$^{-3}$. If the oxygen concentration is too high, crystallization is hard to occur, and the temperature of thermal annealing has to be elevated, or else, the time of thermal annealing has to be longer. If the concentration is too low, the leakage current in an OFF state is increased due to the back light. For that reason, the concentration range was defined from $4\times10^{19}$ to $4\times10^{21}$ atoms·cm$^{-3}$. Hydrogen concentration was $4\times10^{20}$ atoms·cm$^{-3}$, or one atoms % compared to the silicon of $4\times10^{22}$ atoms·cm$^{-3}$.

After a silicon film is amorphous state was manufactured at a thickness of 500 to 5000 Å, e.g. at 1500 Å, in the manner described above, middle temperature heat treatment was carried out in a non-oxidating atmosphere at a temperature of 450 to 700° C., for 12 to 70 hours, for example, the film was maintained at a temperature of 800° C. in a hydrogen atmosphere. Since the silicon oxide film is amorphous structure is formed on the substrate surface under the silicon film, a specific nucleus does not exist due to the heat treatment, and the entire body is uniformly thermal-annealed. Namely, amorphous structure is retained during the manufacture of the film, and hydrogen is simply mixed therein.

The silicon film was transformed from the amorphous structure into the state of higher order, through the annealing, with a part thereof being crystallized. In particular, a relatively higher order region of the silicon coated film tends to be crystallized into a crystalline region by the annealing. However, silicon atom are pulled with each other since bonds are formed between such regions by silicon atoms existing therebetween. Laser Raman Spectroscopy results show a peak shifted to the frequency lower than the single crystal silicon peak of 522 cm$^{-1}$. The apparent grain diameter thereof is calculated 50-500 Å, based on a half band width, seemingly like the case of a micro-crystal, however, actually, a film in semi-amorphous structure was formed including therein high crystalline regions constituting a cluster structure, clusters being anchored to each other by bonds between silicon atoms.

As a result, it can be said that substantially no GB exits in the film. Since carriers can easily move between each cluster through the anchored portions, mobility higher than that of polycrystalline silicon in which GB obviously exists, is obtained. Namely, Hall mobility (μh) of 10 to 200 cm$^2$/Vsec, electron mobility (μe) of 15 to 300 cm$^2$/Vsec can be obtained.

When polycrystallization of the film is carried out by high temperature annealing process at 900-1200° C., instead of the above-mentioned middle temperature annealing process, segregation of impurities in the film occurs due to the solid growth from nucleus, whereby impurities such as oxygen, carbon, nitrogen are increased in the GB, and, although the mobility in crystal is higher, the movement of carriers is hindered by a barrier formed by the GB. Consequently, the mobility no less than 10 cm$^2$/Vsec cannot be achieved in practice. From that reason, the silicon semiconductor having semi-amorphous or semi-crystalline structure is used in this embodiment.

Referring to FIG. 14(A), a silicon film is photo-etched by a first photomask P14, and a region 13 (channel width of 20 μm for NTFT was manufactured on the side of the A-A' cross section shown in the figure, while a region 22 for PTFT on the side of B-B' cross section.

A silicon oxide film was formed thereon at a thickness of 500 to 2000 Å, e.g. at 1000 Å, as a gate insulating film. The manufacture thereof was carried out under the same conditions for those applied for the manufacture of the silicon oxide film as a blocking layer. A small amount of fluorine may be added during the manufacture thereof, so as to stabilize sodium ion.

On the upper surface thereof, a silicon film doped with phosphorus at 1 to 5×10$^{21}$ atoms·cm$^{-3}$, or a multi-layered film comprising this silicon film and molybdenum (Mo), tungsten (W), MoSi$_2$ or WSi$_2$ film formed thereupon, was formed, which was then subjected to a patterning process using a second photomask P15, and the structure shown in FIG. 14(B) was thereby obtained. A gate electrode 9 for NTFT, as well as a gate electrode 21 for PTFT were formed. In this embodiment, as a gate electrode P-doped Si of 0.2 μm and molybdenum of 0.3 μm thereon were formed and channel length of the NTFT was 10 μm and channel length of the PTFT was 7 μm. Referring to FIG. 14(C), boron was ion-doped at a dose of 1 to 5×10$^{15}$ cm$^{-2}$, to a source 18 and a drain 20 for PTFT. Referring to FIG. 14(D), then, a photoresist 61 was formed using a photomask P16. Phosphorus was ion-doped at a dose of 1 to 5×10$^{15}$ cm$^{-2}$, as a source 10 and a drain 12 for NTFT.

In the case aluminum (Al) is used as a gate electrode material, after patterning the gate electrode material by a second photomask P16, anodic oxidation can be applied to the surface thereof. In this case, a self-aligning process can be employed, whereby the contact hole of a source and drain can be formed closer to the gate, and the TFT characteristic can be further improved thereby, due to the improved mobility as well as the reduction in threshold voltage.

Thermal annealing process was again carried out at 600° C., for 10 to 50 hours. By activating impurities, a source 10, a drain 12 of NTFT and a source 18, a drain 20 of PTFT ware manufactured as P$^+$ type and N$^+$ type. Channel forming regions 19, 11 are formed as semi-amorphous semiconductors, under gate electrodes 21, 9.

In this way, C/TFT can he manufactured without elevating the temperature not less than 700° C. in every process.

Therefore, it is not necessary to use an expensive material such as quartz for the substrate, and this is a most suitable process for manufacturing the wide-screen liquid crystal display device in accordance with the present invention.

The thermal annealing process was carried out twice in this embodiment, as shown in FIG. 14 (A), (D). However, the annealing process shown in FIG. 14(A) may be omitted dependent upon the desired characteristics, and the manufacturing time can be shortened by replacing these two annealing processes with only one annealing process shown in FIG. 14(D).

Referring to FIG. 14(E), a silicon oxide film 65 was formed as an interlayer insulating film by sputtering as described supra. The silicon oxide film can be formed by LPCVD, photo-CVD, or by atmospheric pressure CVD. The thickness thereof was, for example, 0.2 to 0.6 μm. Thereafter, an opening 56 for electrode was formed using a photomask P17. Aluminum was then sputtered on the surface of the entire structure, as shown in FIG. 14(F), and after a lead 71 as well as a contact 72 was manufactured using a photomask P18, an organic resin 69 for flattening, for example, a translucent polyimide resin was applied to and formed on the surface thereof, and an opening for electrode was formed again by a photomask P19.

An ITO (indium tin oxide) was formed by sputtering, so as to form two TFTs in a complementary structure, and to connect the output terminal thereof to one picture element electrode of the liquid crystal device, as a transparent electrode. It was then etched using a photomask P20, and an electrode 17 was formed thereby. The ITO was formed at a temperature ranging from room temperature to 150° C. and then annealed at 200 to 400° C. in oxygen or atmosphere. The electric characteristics of the TFT thereby obtained were: mobility of 20 (cm$^2$/Vsec), Vth of −5.9 (V) for PTFT: and mobility of 40 (cm$^2$/Vsec), and Vth of 5.0 (V) for NTFT.

In this manner, one substrate for the liquid crystal device was manufactured. The arrangement of the electrode, etc., of the liquid crystal display device is shown in FIG. 13. NTFT 13 and PTFT 22 were provided on the intersection of a first signal line 3 and a second signal line 4, whereby the device has a matrix form using C/TFT. NTFT 13 is connected to the second signal line 4 through the contact of the input terminal of a drain 10, while a gate 9 is connected to the signal line 3 forming a multi-layered wiring. The output terminal of a source 12 is connected to an electrode 17 of the picture element through a contact.

On the other hand, regarding PTFT 22, the input terminal of a drain 20 is connected to the second signal line 4 through a contact, while a gate 21 is connected to the signal line 3, and thB output terminal of a source 16, to the picture element electrode 17 through a contact, in the same manner as NTFT. This embodiment is formed by repeating such a structure horizontally and vertically.

An ITO (indium tin oxide) was then formed by sputtering on the soda-lime glass plate on which a silicon oxide film was formed by sputtering at a thickness of 2000 Å. The ITO was formed at a temperature ranging from room temperature to 150° C., and was subjected to the annealing process at 200 to 300° C. in oxygen or atmosphere. A color filter layer was then formed thereon in the same manner as described in the Preferred Embodiment 1 to obtain a second substrate.

A polyimide precursor was then printed on the substrates by an offset method, and was baked in a non-oxidation atmosphere, e.g. in nitrogen, for an hour, at a temperature of 350° C. It was then subjected to a known rubbing method, so as to change the surface condition of the polyimide, and a means to allow for a liquid crystal molecule to be oriented in a certain direction at least in the initial stage was provided.

The nematic liquid crystal composition was sandwiched by the first and the second substrates as described above, after fixing the periphery of the first and second substrates by an epoxy adhesive. Since the pitch of the leads on the substrate was as fine as 46 μm, connection was made by a COG method, in this embodiment, a gold bump provided on an IC chip was connected, by an epoxy silver palladium, and the IC chip and the substrata were buried and fixed by epoxy metamorphic acrylic resin for solidification and the sealing of these. A polarizing plate was then attached to the outside thereof, and a transmission type liquid crystal display device was obtained.

Figure 15:
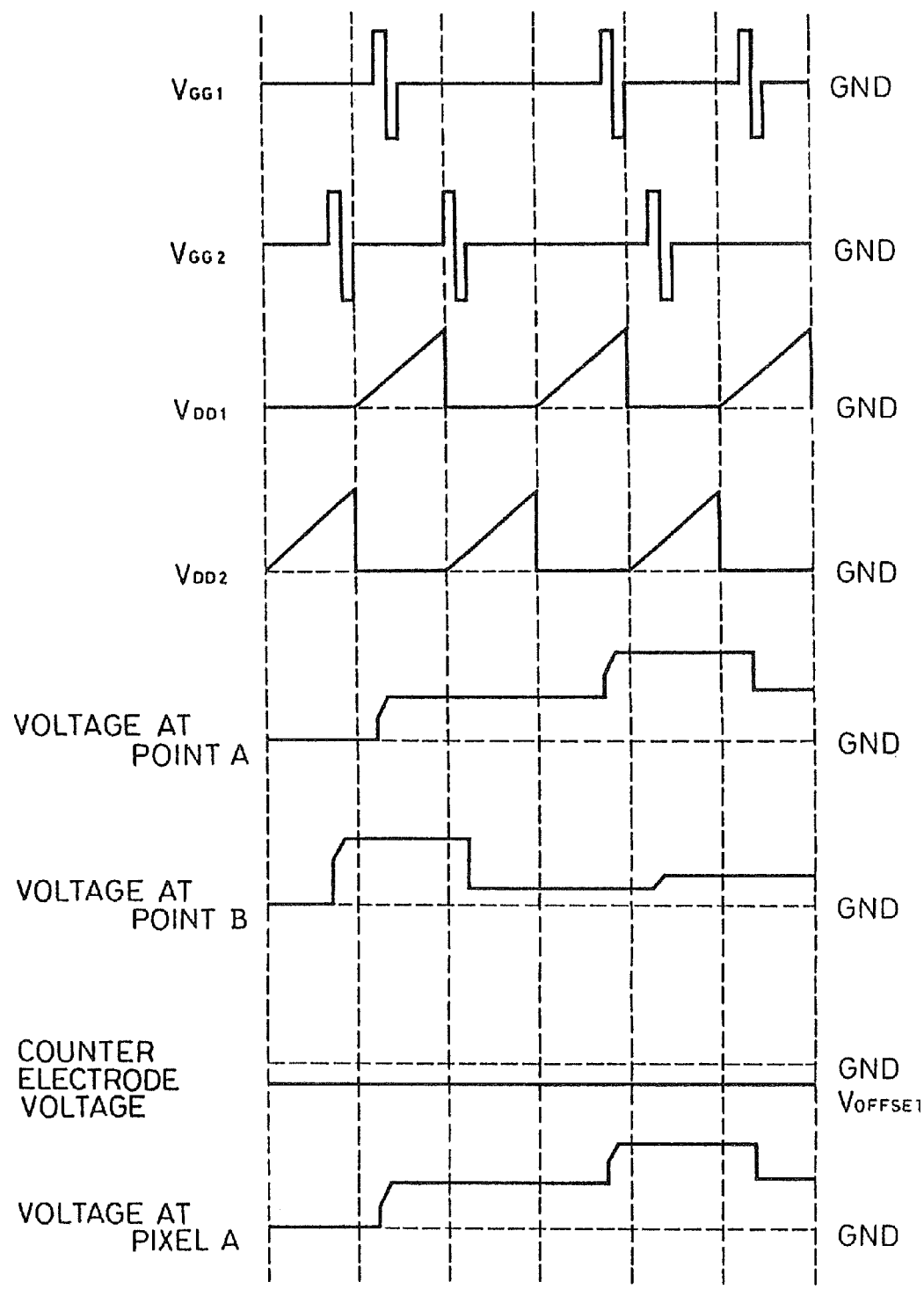
FIG. 15 shows an example of a drive waveform in accordance with the present invention.
Figure 16:
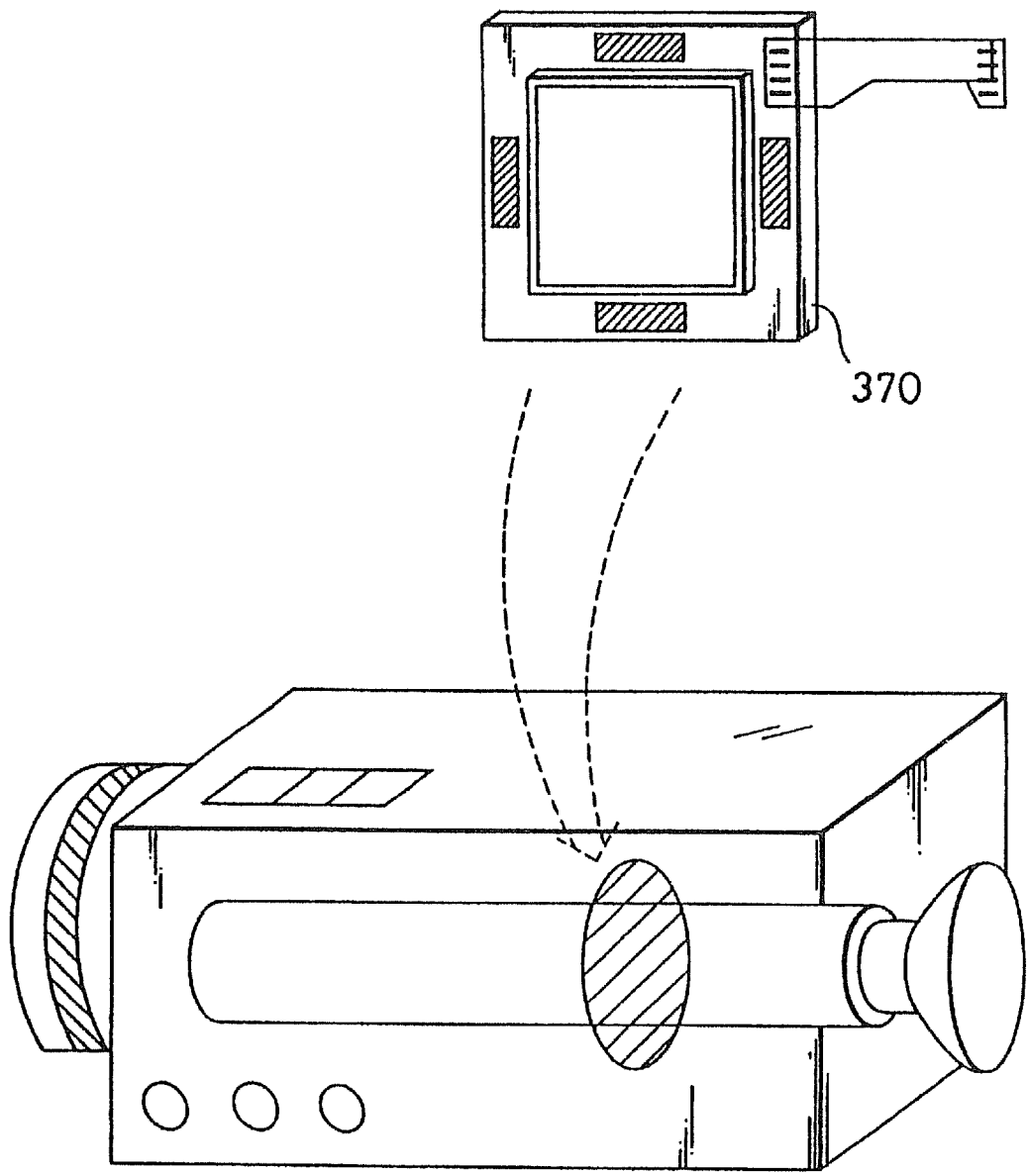
FIG. 16 shows an example of application I the electro-optical device in accordance with the present invention, to a view finder.

The driving waveform, used in this embodiment is shown in FIG. 15. In this embodiment, a ramp wave is used as shown in FIG. 15. Formation of a ramp wave is easy and it is easy to convert original gradation data into Δt in the ramp wave. FIG. 16 shows a view finder in accordance with this embodiment and a video camera utilizing the view finder. The video camera comprises the electro-optical device 370 manufactured in the manner described supra and a cold cathode tube 371 having flat emission.

When an analogue gradation display is carried out in a normal mode for the electro-optical device comprising, for example, 49,152 pairs of TFTs of 384×128 dots formed into a 50 mm square (which is obtained by dividing a substrate of 300 nm square into 36 pieces), the variation in TFTs characteristics is ±10% as a whole, and a gradation display having is gradation levels is thus an upper limit, whereas, when a digital gradation display is carried out in accordance with the present invention, it is hardly affected by the variation in TFTs characteristics, and a gradation display having 128 gradation levels is thereby possible, while various and subtle expression of 2,097,152 kinds of colors is achieved in a color display mode.

Preferred Embodiment 3

Figure 17:
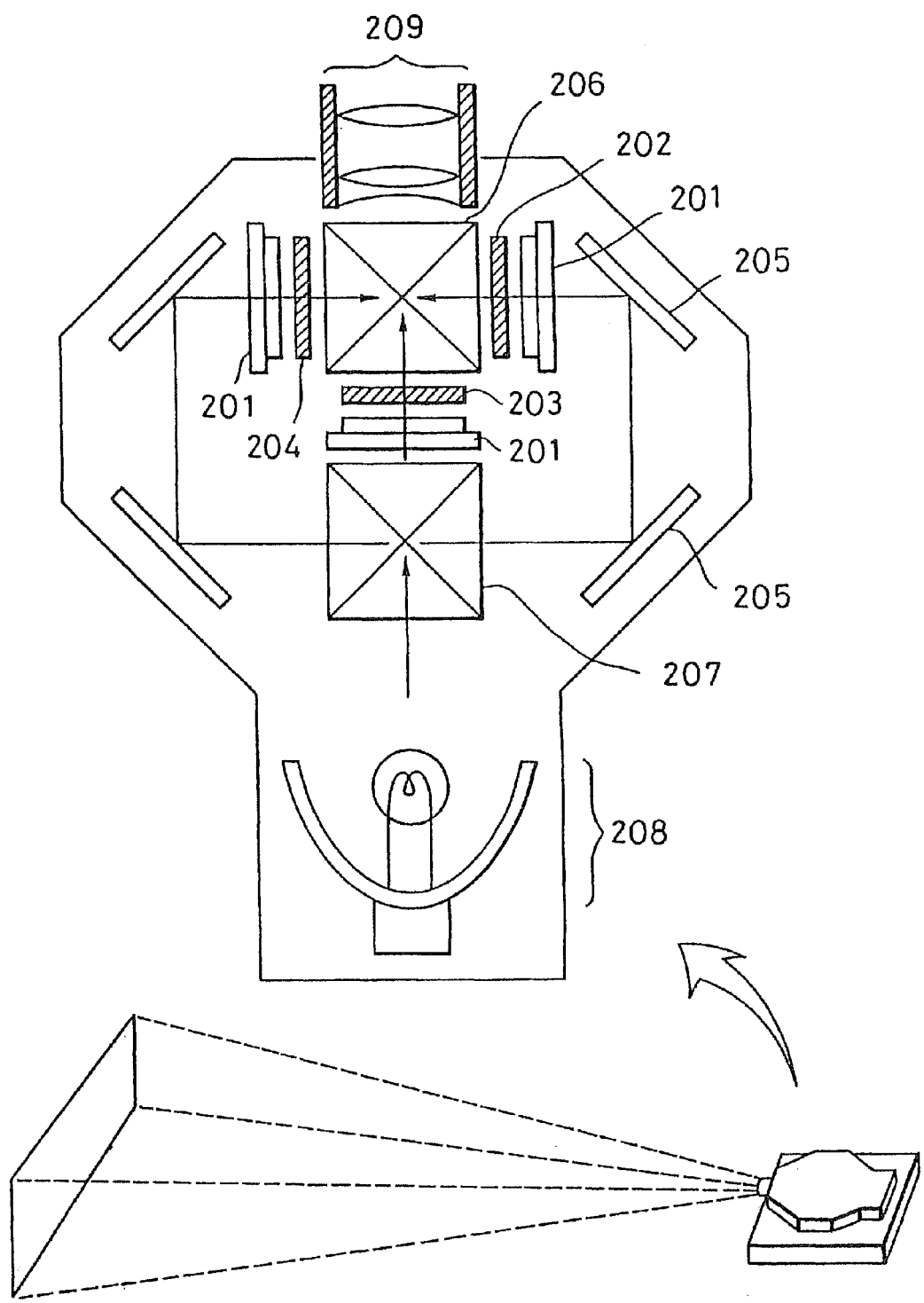
FIG. 17 shows an example of the electro-optical device in accordance with the present invention, of a front type projection television.

In this embodiment, a projection type image display device as shown in FIG. 17 will be explained.

In this embodiment, the image projecting part for the projection type image display device was assembled by three electro-optical devices 201. Each of devices 201 has a 640× 480 dots, and 307,200 picture elements were manufactured in a four-inch diagonal: the size per one picture element was 127 μm square.

As the structure of the projection type image display device, the electro-optical devices 201 were installed by dividing into three elementary colors of red, green, and blue: it comprises a red filter 202, a green filter 203, a blue filter 204, a reflecting plate 205, prism mirrors 206, 207, a metal halide light source 208 of 150 W, and an optical system 209 for focusing.

The substrate of the electro-optical device in accordance with this embodiment was the same as that manufactured in the manner described in the Preferred Embodiment 2, and has a matrix circuit of C/MOS structure. The liquid crystal material used in this embodiment was of dispersion type or polymer dispersion type.

Figure 18:
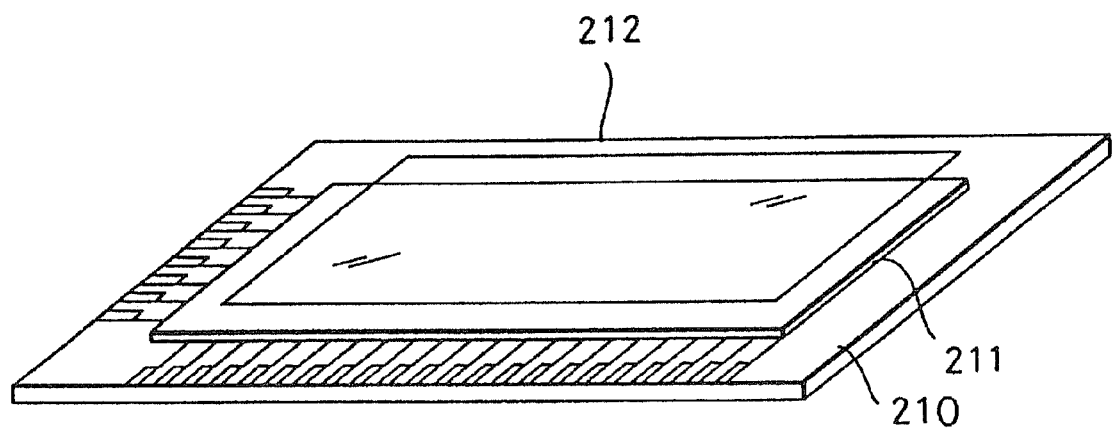
FIG. 18 shows a schematic structure of the electro-optical device in accordance with the present invention.

A schematic diagram is shown In FIG. 18. A mixture comprising a fumaric acid polymer resin and a nematic liquid crystal at a ratio of 65:35 mixed in a common solvent of xylene was formed on the substrate 210 at a thickness of 10 μm by a die-cast method. Then, the solvent was removed in nitrogen atmosphere at a temperature of 120° C., for 180 minutes, and a liquid crystal dispersion layer 211 was formed thereby. Conduct time can be shortened by reducing the pressure slightly lower than atmosphere.

An ITO (indium tin oxide film) was formed by sputtering, so as to obtain a counter electrode 212. The ITO was formed at a temperature ranging from room temperature to 150° C. A translucent silicon resin was applied thereon at a thickness of 30 μm, by printing, and was baked for thirty minutes at 100° C., so as to obtain the electro-optical device.

Figure 19:
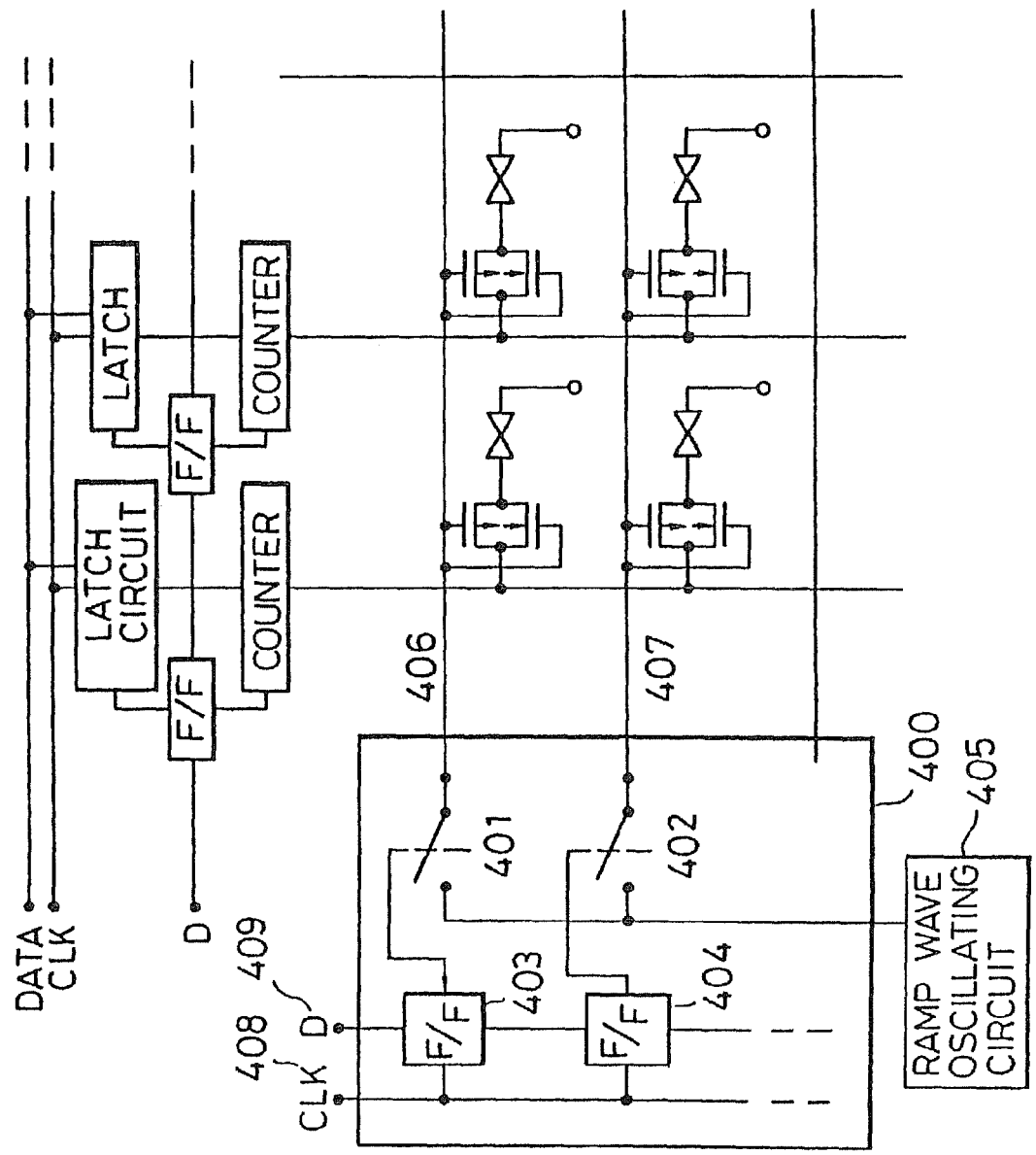
FIG. 19 shows a system structure of a drive circuit of the electro-optical device applicable to the present invention.

The driving IC used in this embodiment is shown in FIG. 19, The structure of the information electrode side is the same as described in the Preferred Embodiment 1. In a driving circuit 400 connected to the wirings 405, 407 on scanning side, the ramp wave transmitted from a ramp wave oscillating circuit 405 is controlled by flip flop circuits 403, 404 of a clock CLK 406, and a select signal is added thereto.

A gradation display is possible by digitally controlling the timing for cutting the ramp wave on the side of a scanning line by a bipolar pulse on the side of an information line.

For example, when a gradation display is performed in a normal analogue mode for the electro-optical device comprising 307,200 pairs of TFTs of 640×480 dots formed in 300 mm square, 16 gradation levels are an upper limit due to the variation in TFT characteristics of approximately ±10%. In the case of digital gradation display in accordance with the present invention, however, since it is hardly affected by the variation in characteristics of TFT devices, a gradation display having 258 gradation levels is possible, while a various and subtle display of as many as 16,777,216 kinds of colors is possible.

The electro-optical device can be applied not only to a front type projection television as illustrated in FIG. 17, but also to a rear type projection television.

Preferred Embodiment 4

Figure 20:
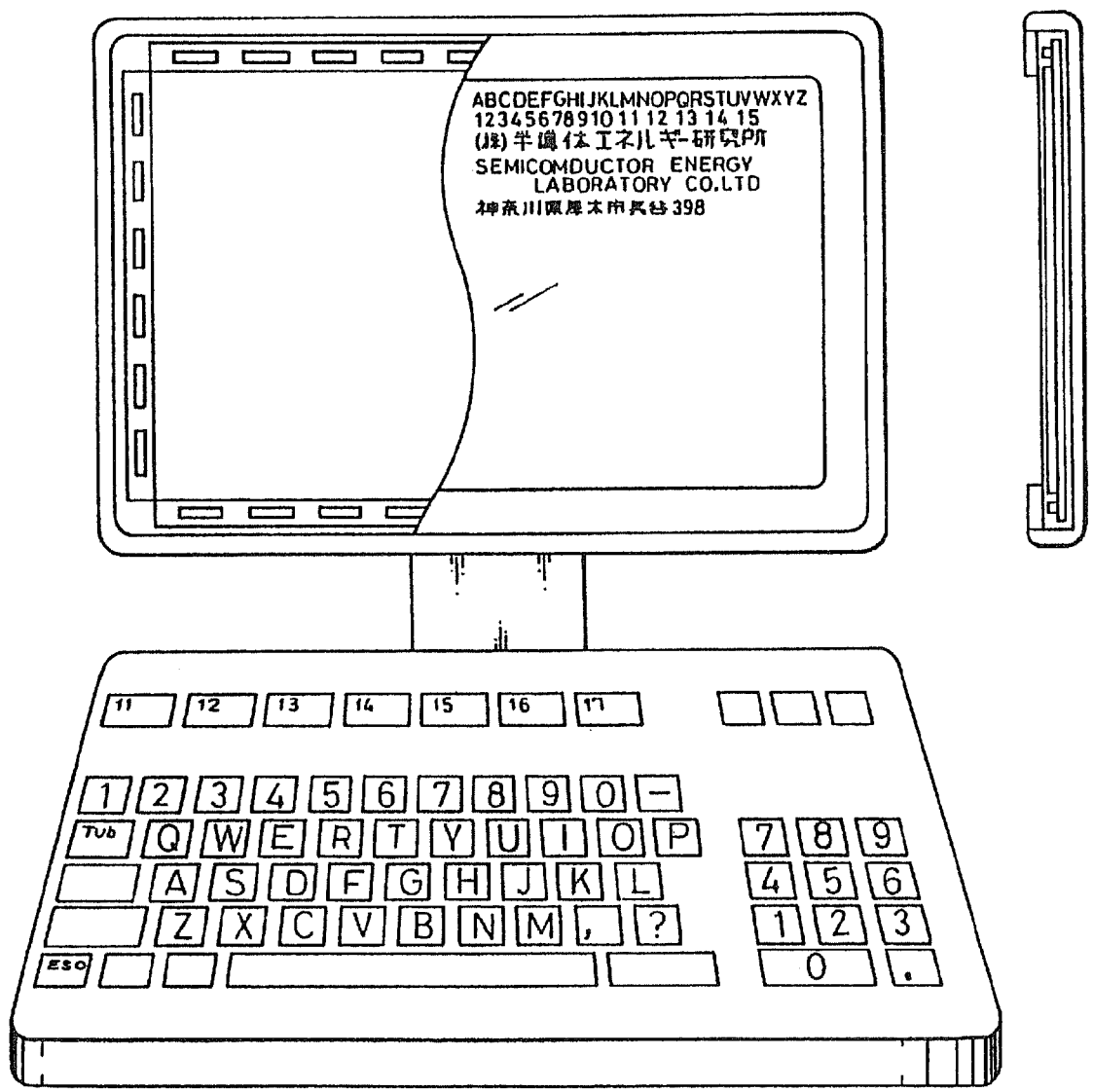
FIG. 20 shows an example of the application of the electro-optical device in accordance with the present invention, to a personal computer.

In this embodiment, an electro-optical device for portable computer was manufactured using a reflection type liquid crystal dispersion display device as shown in FIG. 20, and the explanation thereof will be herein made:

The first substrate used in this embodiment was the same as that manufactured in the process in accordance with the Preferred Embodiment 1. A nematic liquid crystal and a fumaric acid polymer resin mixed therein 15% of a black pigment at a ratio of 35:85 were dissolved in a common solvent of xylene. The solution was applied on the substrate 210, at a thickness of 10 μm, by a die-cast method. The solvent was then removed in nitrogen atmosphere at 120° C., for 180 minutes, and a liquid crystal dispersion layer 211 was formed thereby.

As the black pigment is used therein, black color appears at the time of light scattering or at the time of application of no electric field, while white color is displayed in a transmission state or at the time of application of electric field, whereby a flat display that was difficult for a dispersion type liquid crystal display is possible like that of the letter written on a sheet of paper.

An ITO (indium tin oxide film) was then formed by sputtering, so as to obtain a counter electrode 212. The ITO was formed at a temperature ranging from room temperature to 150° C. A white-colored silicon resin was applied thereon at a thickness of 55 µm, by printing, and was baked for ninety minutes at a temperature of 100° C., so as to obtain the electro-optical device.

As a modification of this embodiment, no black pigment was contained in the liquid crystal dispersion layer 211. In this case, the rear surface has to be made black. In this case, white color appears at the time of light scattering, while black color is displayed in a transmission state. A flat display was possible like that of the letter written on a sheet of paper.

Preferred Embodiment 5

In this embodiment, an electro-optical device provided with modified transfer gate TFTs in complementary structure for one picture element was manufactured by anodic oxidation technique, as shown in FIG. 21. The manufacture of the TFTs in accordance with this embodiment is basically the same as that in accordance with the first preferred embodiment, and its processes proceed almost in the same manner as shown in FIG. 7, however, since the anodic oxidation technique was employed as mentioned above, metallic material was used as a gate electrode material, so as to utilize the anodic oxidation film thereof as a part of an insulating film, whereby manufacturing process was slightly changed.

Referring to FIG. 21, PTFT 95 and NTFT 96 are connected to a common gate wiring 107 at gate terminals thereof, and one of source and drain regions of the PTFT and one of source and drain regions of the NTFT are connected together and connected to the other signal line 102. The other one of the source and drain regions of the NTFT are connected to a common picture element electrode 108.

Referring to FIGS. 22(A) to 22(G), a silicon oxide film as a blocking layer 99 was manufactured on the glass substrate 98, at a thickness of 1000 to 3000 Å, by magnetron RF (high frequency) sputtering. The conditions for the process are: 100% oxygen atmosphere, film formation temperature of 15° C., output of 400 to 800 W, and the pressure of 0.5 Pa. The film formation rate was 30 to 100 Å/min. using quartz or single crystalline silicon as a target.

A silicon film 97 was formed thereon by LPCVD (low pressure chemical vapor deposition), sputtering, or by plasma CVD.

Figure 22A:
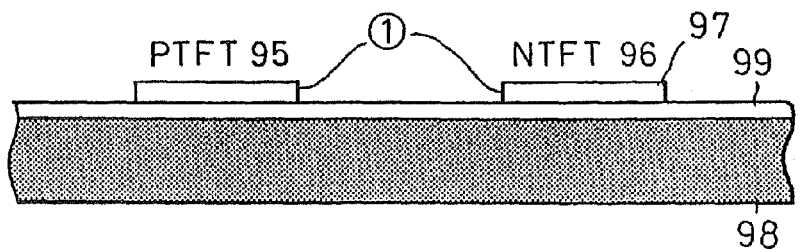
FIGS. 22 (A) to (G) corresponding to the third preferred embodiment, show schematic cross sectional views indicating the manufacturing process of the TFT applicable to the present invention.

Referring to FIG. 22(A), the silicon film was photo-etched using a first photomask P21, and a region for PTFT was manufactured on the left hand side of the figure, as well as that for NTFT on the right hand side thereof.

A silicon oxide film as a gate insulating film 103 was formed thereon at a thickness of 500 to 2000 Å, e.g. at 700 Å. The manufacture thereof was carried out under the same conditions employed for the silicon oxide film 99 as a blocking layer.

The alloy of aluminum and silicon was formed thereon as a material for a gate electrode 107, at a thickness of 3000 Å to 1.5 µm, e.g. at 1 µm, by a known sputtering method.

As the material for the gate electrode beside aluminum silicide, molybdenum (Mo), tungsten (W), titan (Ti). tantalum (Ta). chromium (Cr), or an alloy of these material or an alloy of silicon and these material, or a multi-layered film comprising a silicon layer and a layer of these metal can be used.

Figure 22B:
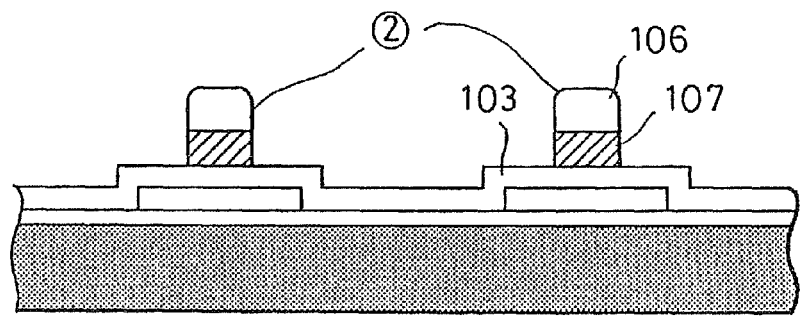

Further, a silicon oxide film was formed as an insulating film 106, at a thickness of 3000 Å to 1 µm, or at 3000 Å in this embodiment, by sputtering, on the gate electrode material. Then, the insulating film 106 and the gate electrode 107 were subjected to a patterning process using a second photomask P22, and the gate electrode 107 as well as the insulating film 106 were formed as shown in FIG. 22(B).

Figure 22C:
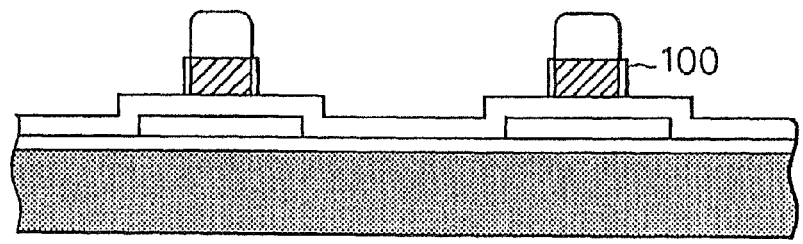

The substrate was then dipped in an AGW electrolytic solution in which propylene glycol was added to a 3% of tartaric acid solution at a ratio of 9:1, while the gate electrode of aluminum silicide was connected to the anode of a power source, and dc power was applied thereto with platinum used as a cathode, Each of the gate electrodes was connected to corresponding gate wiring and all the gate wirings are connected by a terminal in the vicinity of an end part of the substrate and an anodic oxidation film 100 was formed in the vicinity of the side surface of the gate electrode by anodic oxidation, as shown in FIG. 22(C).

As the solution used for the anodic oxidation, typically, a strong acid solution such as sulfuric acid, nitric acid, phosphoric acid, or a mixed acid such as tartaric acid or citric acid mixed with ethylene glycol or propylene glycol, can be used. Salt or alkali solution may be mixed thereto, in order to adjust pH or the solution, when required.

The anodic oxidation was carried out as follows: after current was run at the current density of 2.5 mA/cm$^2$ in a constant current mode, for thirty minutes, then five minutes of process in a constant voltage mode followed, so as to form an aluminum oxide film of 2500 Å in the vicinity of the side surface of the gate electrode. When the insulating characteristic of the aluminum oxide was measured using a sample manufactured under the same conditions employed for this oxidation process, resistivity was 10$^9$ ohm·meter, and dielectric strength was 2×10$^6$V/cm.

The observation of the surface of the sample by a scanning electron microscope revealed unevenness on the surface in an approximately 8000 magnifying power mode, however, no fine hole was observed, which means the evidence of a good insulating film.

Figure 22D:
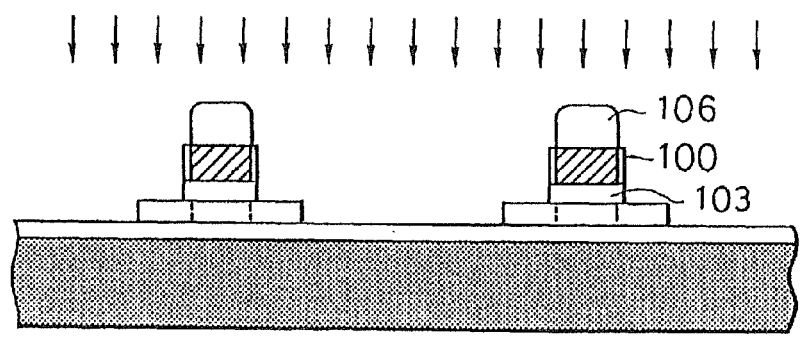

After an insulating film 103 on the semiconductor was removed by etching as shown in FIG. 22(D), boron was ion-implanted at a dose of 1 to 5×10$^{15}$ cm$^{-2}$ as an impurity for PTFT, on the entire surface of the substrate. The doping was carried out at a concentration of approximately 10$^{19}$ atoms·cm$^{-2}$, so as to form a source, drain region of PTFT. In this embodiment, ion doping was carried out after the insulating film on the surface was removed, however, if the conditions for ion-implantation are changed, doping is possible through the insulating film 103 on the semiconductor film.

Figure 22E:
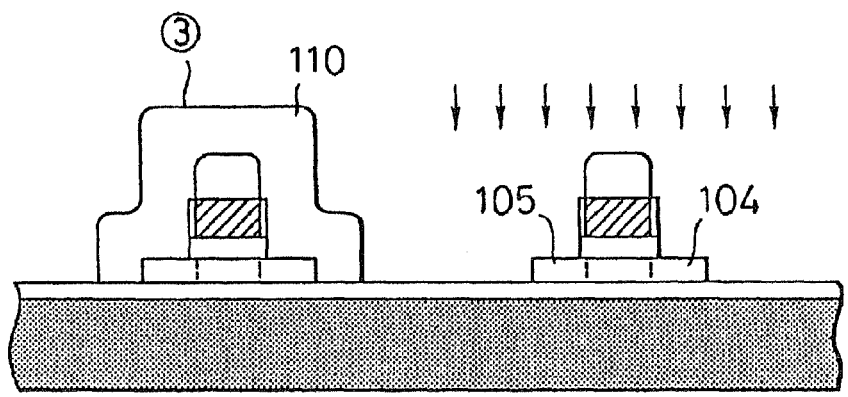

A photoresist 110 was formed using a third photomask P23 as shown in FIG. 22(E), and after a PTFT region was covered therewith, phosphorus was ion-implanted at a dose of 1 to 5×10$^{15}$ cm$^{-2}$, to the source and drain region for NTFT, so as to obtain a dope concentration of approximately 10$^{20}$ atoms·cm$^{-3}$. In the ion doping process as described above, the ion-implanting direction was set oblique to the substrate, in order to allow for the impurity to penetrate into a portion of the semiconductor under the anodic oxidation film in the vicinity of the gate electrode, so as to make the end of the source and drain regions 104, 105 almost identical with the end of the gate electrode. Sufficient insulating function is thereby expected for an anodic oxidation film 100 to an electrode wiring to be formed in a following process, and it is thus not necessary to form another insulating film.

Activation process was carried out by irradiating a laser beam to the source and drain regions. Since the activation process was carried out instantaneously, at the time, it is not necessary to consider the diffusion of the metallic material used for the gate electrode, and TFT of high reliability was manufactured.

Figure 22F:
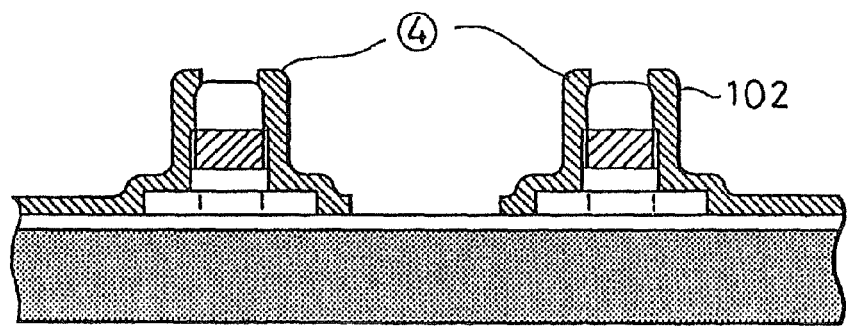

Aluminum was formed on the entire surface thereof by sputtering, and after an electrode lead 102 was obtained by patterning using a fourth mask P24, the semiconductor which does not overlap with an electrode 102, an insulating film 106 on the gate electrode 107, and the anodic oxidation film 100 in the vicinity of the side surface of the gate electrode 107 was etched off, and a complete device separation was carried out so as to complete TFT. In this manufacturing method, complementary TFTs were manufactured using four pieces of masks, which is shown in FIG. 22(F).

Figure 22G:
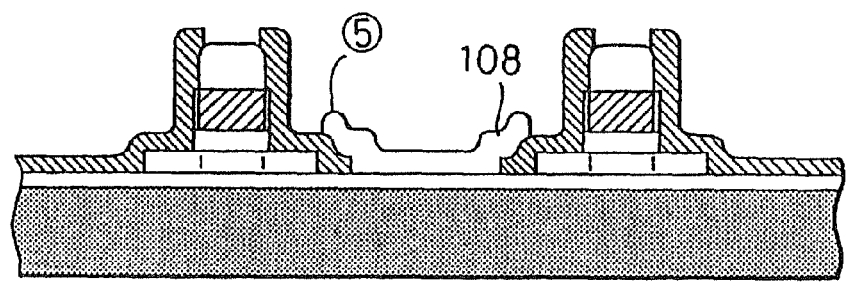

Referring to FIG. 22(G), to achieve complementary TFTs, and to connect the output terminal thereof to one picture element electrode of the liquid crystal device as a transparent electrode, an ITO (indium tin oxide film) was formed by sputtering, and was etched using a fifth photomask ⑤ so as to form a picture element electrode 108.

Figure 21A:
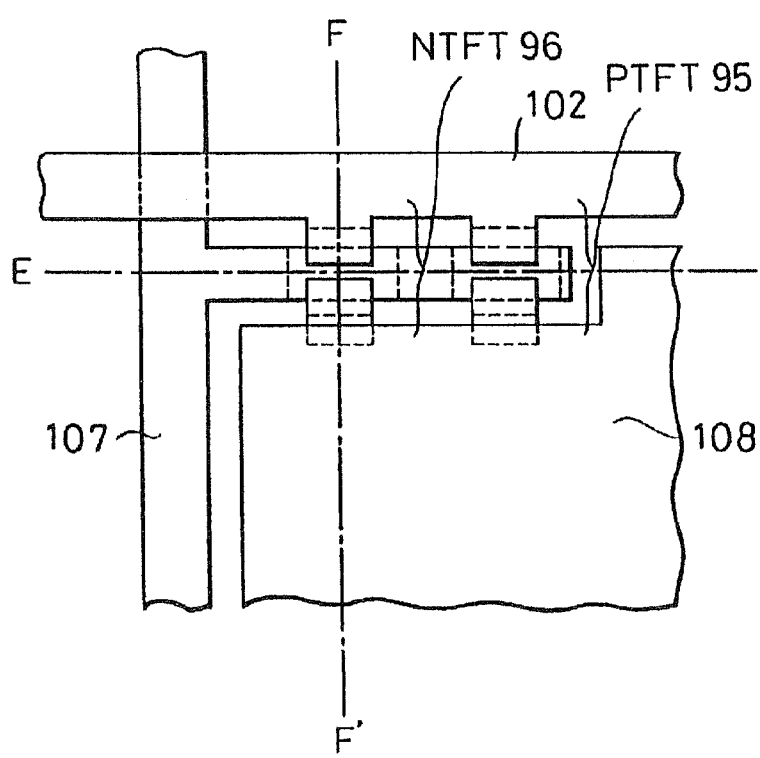
FIG. 21 corresponding to the third preferred embodiment, shows the arrangement of the active matrix electro-optical device applicable to the present invention.
Figure 21B:
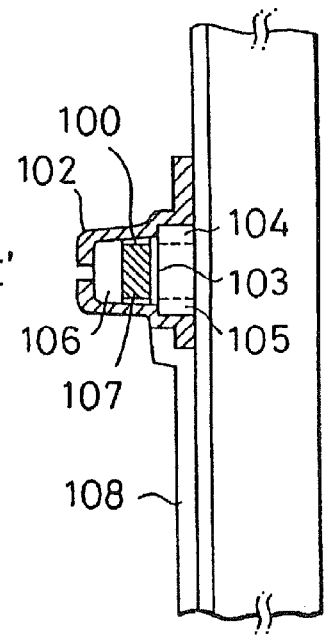
Figure 21C:
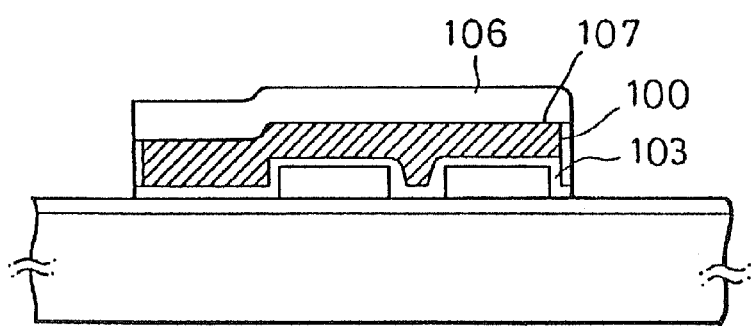

In this way, modified transfer gate TFTs having arrangement and structure as shown in FIG. 21(A), (B), (C), were completed. FIG. 21(B) is a cross sectional view corresponding to a F-F' cross section shown in FIG. 21(A), while FIG. 21(C) is a cross sectional view corresponding to an E-E' cross section shown in FIG. 21(A). As clearly shown in FIG. 21(B), (C), the interlayer insulating film 10S invariably exists on the gate electrode 107, and it works sufficiently as an interlayer insulating means at an intersection of the lead part of a gate wiring 107 and that of a source or drain wiring 102, whereby the generation of wiring capacity at the intersection was able to be suppressed.

In this embodiment, complementary TFTs having structure in which the capacity in the vicinity of wirings is less, and the fear of short-circuit in the vicinity of the gate insulating film is less could be formed using masks fewer than those used in the first preferred embodiment, without employing a higher-grade process technique such as an anisotropic etching to provide an active element substrate.

The substrate formed in the manner described above was used as a first substrate and a second substrate (counter substrate) was formed by forming a counter electrode on a substrate and further forming an orientation control film thereon. The first and second substrates were joined with each other and an STN type liquid crystal was injected between the first and second substrate by a known technique. An active matrix type STN liquid crystal electro-optical device was then completed.

The applications to the electro-optical device were described in the above examples, however, the present invention is not limited thereto and the application to other devices or to a three-dimensional integrated circuit device, and so on, is also possible.

The manufacture of TFT device was possible in this embodiment, using masks much fewer than those used in the conventional method. By applying the device of this structure to the manufacture of a semiconductor appliance, as the number of mask was reduced, a manufacturing process was simplified and a production yield was improved, whereby a semiconductor application device was offered at a more inexpensive manufacturing cost.

In this embodiment, the anodic oxidation film was formed on the surface or the metal gate electrode by the anodic oxidation and a three-dimensional wiring having a grade separation was provided thereon which was used for a gate electrode material, and which was provided on the surface thereof. Also, by exposing the contact part alone of a source and drain from the gate electrode and the anodic oxidation film, a feeding point is made closer to the channel and thereby the deterioration in the frequency characteristic of the device, and the increase in ON resistance were prevented.

In the case aluminum was used as a gate electrode material, as in this embodiment, $H_2$ in the gate oxidation film was reduced into H by the catalytic effect of aluminum, at the time of annealing process during device formation, and an interfacial level density ($Q_{SS}$) was reduced, much compared with the case a silicon sate was used instead, and a device characteristic was thereby improved.

Since source and drain regions of TFT were self-aligned, and the contact part of the electrode fed to the source and drain regions was also positioned in a self-aligning manner, the area of the device required for TFT was reduced, and the circuit integration was improved thereby. When TFT was used as an active device of the electro-optical device, the aperture ratio of liquid crystal panel was increased.

The anodic oxidation film in the vicinity of the side surface of the gate electrode was positively used, and TFT of characterized structure was offered thereby, and the manufacture of TFT could be carried out using the fewest possible masks of at least two pieces.

The foregoing description of preferred embodiments has been presented for purposes of illustration and description. It is not intended to be exhaustive or to limit the invention to the precise form described, and obviously many modifications and variations are possible in light of the above teaching. The embodiments were chosen in order to explain most clearly the principles of the invention and its practical application thereby to enable others in the art to utilize most effectively the invention in various embodiments and with various modifications as are suited to the particular use contemplated. Examples of such modifications are as follows.

Figure 4A:
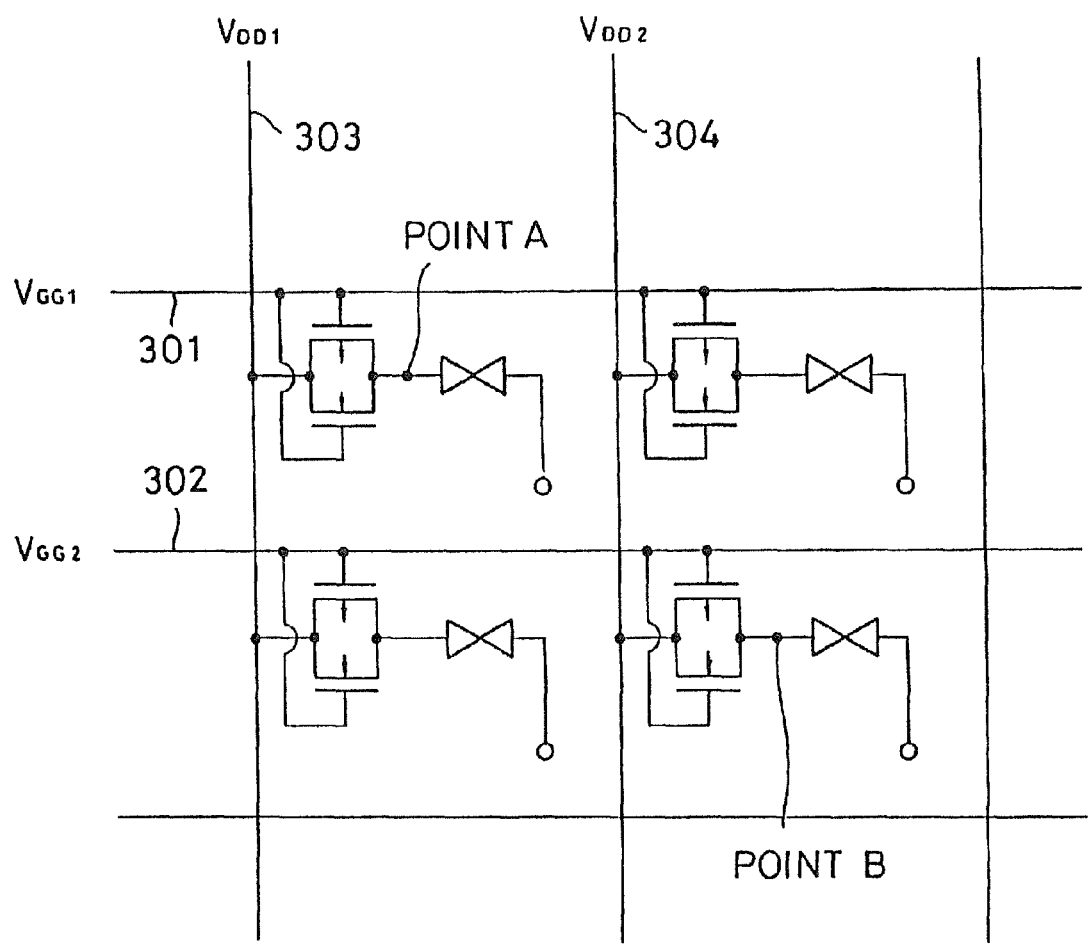
FIG. 4 shows an example of a circuit of an active matrix electro-optical device applicable to the present invention, subject to a part of 2×2 matrix, structure.
Figure 4:
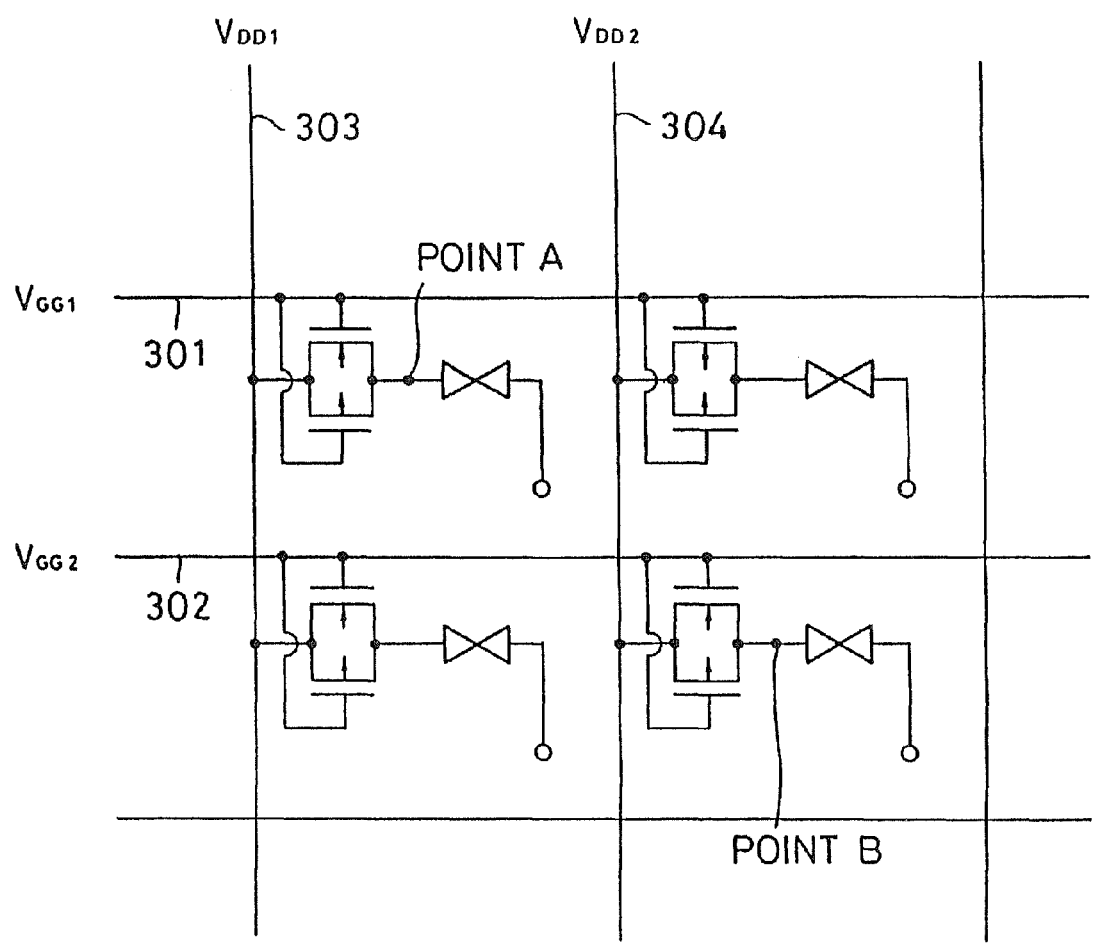
Figure 23:
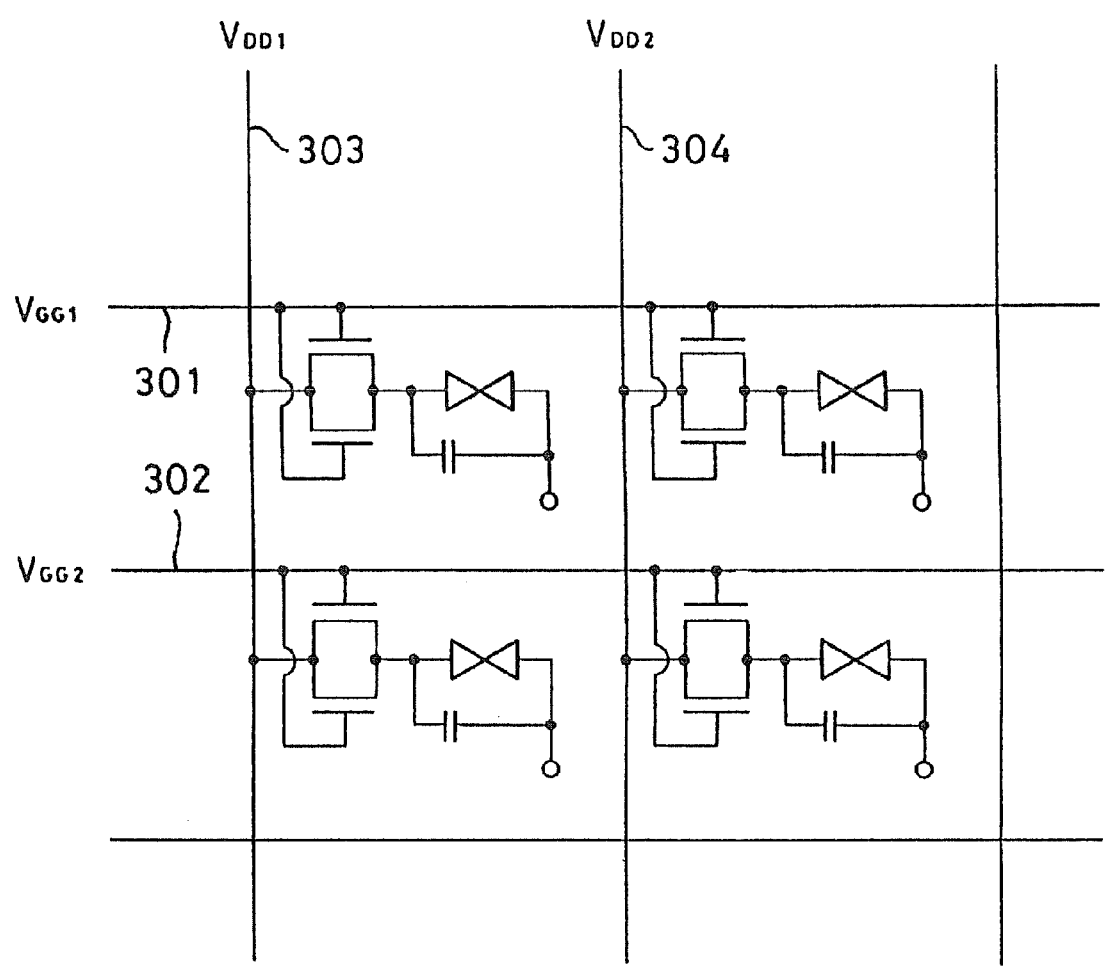
FIG. 23 is a circuit diagram showing an equivalent circuit in accordance with the present invention.

The present invention can be applied to an electro-optical device having a circuit shown in FIG. 23. The circuit is the same as that shown in FIG. 4 except that a capacitor is provided on the substrate and connected to each pixel in parallel with the liquid crystal or the corresponding pixel as shown in FIG. 23.

A nematic liquid crystal, a cholesteric liquid crystal, a ferroelectric liquid crystal or an anti-ferroelectric liquid crystal can be used for a liquid crystal layer provided between a pair of substrates in an electro-optical device of the present invention.

What is claimed is:

1. A device having at least one liquid crystal panel, the liquid crystal panel comprising:
   a first substrate having an insulating surface;
   a second substrate being opposed to the first substrate;
   at least one thin film transistor being formed over the first substrate, the thin film transistor including at least a channel region, a gate insulating film adjacent to the channel region and a gate electrode adjacent to the channel region with the gate insulating film interposed therebetween;
   an interlayer insulating film over the thin film transistor;
   a lead electrode over the interlayer insulating film and electrically connected to one of a source or a drain of the thin film transistor through a first opening in the interlayer insulating film;
   an organic resin film over the interlayer insulating film and the lead electrode;
   a pixel electrode over the organic resin film, the pixel electrode being electrically connected to the lead electrode through a second opening in the organic resin film; and
   an electro-optical modulating layer comprising a mixture of a liquid crystal material and a polymer resin, the electro-optical modulating layer being located between the first substrate and the second substrate,
   wherein the first opening and the second opening do not overlap each other.

2. A device according to claim 1, wherein the organic resin film comprises polyimide.

3. A device according to claim 1, wherein the pixel electrode is transparent.

4. A device according to claim 1, wherein the thin film transistor is a top-gate type in which the gate electrode is located above said channel region.

5. A device having at least one liquid crystal panel, the liquid crystal panel comprising:
- a first substrate having an insulating surface;
- a second substrate being opposed to the first substrate;
- at least one semiconductor element being formed over the first substrate, the semiconductor element including at least a channel region, a gate insulating film adjacent to the channel region and a gate electrode adjacent to the channel region with the gate insulating film interposed therebetween;
- an interlayer insulating film over the semiconductor element;
- a lead electrode over the interlayer insulating film and electrically connected to one of a source or a drain of the semiconductor element through a first opening in the interlayer insulating film;
- an organic resin film over the interlayer insulating film and the lead electrode;
- a pixel electrode over the organic resin film, the pixel electrode being electrically connected to the lead electrode through a second opening in the organic resin film;
- an electro-optical modulating layer comprising a mixture of a liquid crystal material and a polymer resin, the electro-optical modulating layer being located between the first substrate and the second substrate,
- wherein the first opening and the second opening do not overlap each other.

6. A device according to claim 5, wherein the organic resin film comprises polyimide.

7. A device according to claim 5, wherein the pixel electrode is transparent.

8. A device according to claim 5, wherein the semiconductor element is a top-gate type thin film transistor in which the gate electrode is located above the channel region.

9. A television comprising:
- a tuner for receiving television radio wave;
- a liquid crystal panel operationally connected to the tuner, the liquid crystal panel comprising:
- a first substrate having an insulating surface;
- a second substrate being opposed to the first substrate;
- at least one thin film transistor being formed over the first substrate, the thin film transistor including at least a channel region, a gate insulating film adjacent to the channel region and a gate electrode adjacent to the channel region with the gate insulating film interposed therebetween;
- an interlayer insulating film over the thin film transistor;
- a lead electrode over the interlayer insulating film and electrically connected to one of a source or a drain of the thin film transistor through a first opening in the interlayer insulating film;
- an organic resin film over the interlayer insulating film and the lead electrode;
- a pixel electrode over the organic resin film, the pixel electrode being electrically connected to the lead electrode through a second opening in the organic resin film; and
- an electro-optical modulating layer comprising a mixture of a liquid crystal material and a polymer resin, the electro-optical modulating layer being located between the first substrate and the second substrate,
- wherein the first opening and the second opening do not overlap each other.

10. A television according to claim 9, wherein the organic resin film comprises polyimide.

11. A television according to claim 9, wherein the pixel electrode is transparent.

12. A television according to claim 9, wherein the thin film transistor is a top-gate type in which the gate electrode is located above the channel region.

13. A portable computer having a liquid crystal panel, the liquid crystal panel comprising:
- a first substrate having an insulating surface;
- a second substrate being opposed to the first substrate;
- at least one thin film transistor being formed over the first substrate, the thin film transistor including at least a channel region, a gate insulating film adjacent to the channel region and a gate electrode adjacent to the channel region with the gate insulating film interposed therebetween;
- an interlayer insulating film over the thin film transistor;
- a lead electrode over the interlayer insulating film and electrically connected to one of a source or a drain of the thin film transistor through a first opening in the interlayer insulating film;
- an organic resin film over the interlayer insulating film and the lead electrode;
- a pixel electrode over the organic resin film, the pixel electrode being electrically connected to the lead electrode through a second opening in the organic resin film;
- an electro-optical modulating layer comprising a liquid crystal material and a polymer resin, the electro-optical modulating layer being located between the first substrate and the second substrate,
- wherein the first opening and the second opening do not overlap each other.

14. A portable computer according to claim 13, wherein the organic resin film comprises polyimide.

15. A portable computer according to claim 13, wherein the pixel electrode is transparent.

16. A portable computer according to claim 13, wherein the thin film transistor is a top-gate type in which the gate electrode is located above the channel region.

17. A device according to claim 1, wherein the channel region is formed in a crystalline semiconductor island.

18. A device according to claim 5, wherein the channel region is formed in a crystalline semiconductor island.

19. A television according to claim 9, wherein the channel region is formed in a crystalline semiconductor island.

20. A portable computer according to claim 13, wherein the channel region is formed in a crystalline semiconductor island.

21. A device having at least one liquid crystal panel, the liquid crystal panel comprising:
- a first substrate having an insulating surface;
- a second substrate opposed to the first substrate;
- at least one thin film transistor formed over the first substrate, the thin film transistor including at least a channel region, a gate insulating film adjacent to the channel region and a gate electrode adjacent to the channel region with the gate insulating film interposed therebetween;
- an interlayer insulating film over the thin film transistor;
- a lead electrode over the interlayer insulating film and electrically connected to one of a source or a drain of the thin film transistor through a first opening in the interlayer insulating film;

a leveling film over the interlayer insulating film and the lead electrode;

a pixel electrode over the leveling film, the pixel electrode electrically connected to the lead electrode through a second opening in the leveling film;

an electro-optical modulating layer comprising a mixture of a liquid crystal material and a polymer resin, the electro-optical modulating layer being between the first substrate and the second substrate, wherein the first opening and the second opening do not overlap each other.

22. A television comprising:

a tuner for receiving television radio wave;

a liquid crystal panel operationally connected to the tuner, the liquid crystal panel comprising:

a first substrate having an insulating surface;

a second substrate opposed to the first substrate;

at least one thin film transistor being formed over the first substrate, the thin film transistor including at least a channel region, a gate insulating film adjacent to the channel region and a gate electrode adjacent to the channel region with the gate insulating film interposed therebetween;

an interlayer insulating film over the thin film transistor;

a lead electrode over the interlayer insulating film and electrically connected to one of a source or a drain of the thin film transistor through a first opening in the interlayer insulating film;

a leveling film over the interlayer insulating film and the lead electrode;

a pixel electrode over the leveling film, the pixel electrode electrically connected to the lead electrode through a second opening in the leveling film;

an electro-optical modulating layer comprising a liquid crystal material and a polymer resin, the electro-optical modulating layer being between the first substrate and the second substrate, wherein the first opening and the second opening do not overlap each other.

23. A portable computer having a liquid crystal panel, the liquid crystal panel comprising:

a first substrate having an insulating surface;

a second substrate opposed to the first substrate;

at least one thin film transistor being formed over the first substrate, the thin film transistor including at least a channel region, a gate insulating film adjacent to the channel region and a gate electrode adjacent to the channel region with the gate insulating film interposed therebetween;

an interlayer insulating film over the thin film transistor;

a lead electrode over the interlayer insulating film and electrically connected to one of a source or a drain of the thin film transistor through a first opening in the interlayer insulating film;

a leveling film over the interlayer insulating film and the lead electrode;

a pixel electrode over the leveling film, the pixel electrode being electrically connected to the lead electrode through a second opening in the leveling film;

an electro-optical modulating layer comprising a mixture of a liquid crystal material and a polymer resin, the electro-optical modulating layer being between the first substrate and the second substrate, wherein the first opening and the second opening do not overlap each other.

24. A device according to claim 21, wherein the channel region is formed in a crystalline semiconductor island.

25. A device according to claim 21, wherein the pixel electrode is transparent.

26. A television according to claim 22, wherein the channel region is formed in a crystalline semiconductor island.

27. A television according to claim 22, wherein the pixel electrode is transparent.

28. A portable computer according to claim 23, wherein the channel region is formed in a crystalline semiconductor island.

29. A portable computer according to claim 23, wherein the pixel electrode is transparent.

* * * * *